(12) United States Patent
Gunningham et al.

(10) Patent No.: US 9,652,868 B2
(45) Date of Patent: May 16, 2017

(54) AUTOMATIC COLOR PALETTE BASED RECOMMENDATIONS

(71) Applicant: Amazon Technologies, Inc., Seattle, WA (US)

(72) Inventors: Sebastian Jorge Gunningham, Fall City, WA (US); Jenny Ann Blackburn, Seattle, WA (US); Charles Shearer Dorner, Seattle, WA (US); Eva Manolis, Bellevue, WA (US); Timothy Andrew Ong, Sammamish, WA (US); Paul Barnhart Sayre, III, Gig Harbor, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 147 days.

(21) Appl. No.: 14/315,819

(22) Filed: Jun. 26, 2014

(65) Prior Publication Data

US 2015/0379738 A1    Dec. 31, 2015

(51) Int. Cl.
*G06T 11/00* (2006.01)
*G06Q 30/00* (2012.01)
(Continued)

(52) U.S. Cl.
CPC ........ *G06T 11/001* (2013.01); *G06F 17/3025* (2013.01); *G06Q 30/0603* (2013.01); *G06Q 30/0627* (2013.01); *G06Q 30/0631* (2013.01)

(58) Field of Classification Search
None
See application file for complete search history.

(56) References Cited

U.S. PATENT DOCUMENTS

| 5,508,718 A | 4/1996 | Haikin |
| 5,544,284 A | 8/1996 | Allebach et al. |

(Continued)

FOREIGN PATENT DOCUMENTS

| JP | 2012-221317 A | 11/2012 |
| WO | WO 2014/070914 A1 | 5/2014 |

(Continued)

OTHER PUBLICATIONS

"Exalead CloudView Semantics Whitepaper," Doc. No. EN.140.001.0-V1.2; Oct. 2010, pp. 1-30. Retrieved from http:www.3ds.com/fileadmin/PRODUCTS/EXALEAD/Documents/whitepapers/Exalead-CloudView-Semantics-EN.pdf on Aug. 24, 2015.

(Continued)

*Primary Examiner* — Aaron M Richer
(74) *Attorney, Agent, or Firm* — Knobbe, Martens, Olson & Bear LLP

(57) ABSTRACT

Systems and methods are provided for determining whether certain color image metadata is accurate. A color image and associated color image metadata provided by a source for inclusion in an electronic catalog are accessed. A color palette corresponding to the color image is generated. A color name associated with the color palette is determined. A determination is made as to whether the image metadata comprises a color name. If the image metadata comprises a color name, a determination is made as to whether the color name included in the image metadata corresponds to the color name associated with the color palette. If the color name included in the image metadata does not correspond to the color name associated with the color palette or if the image metadata does not comprise a color name, the color name associated with the color palette is added to the color image metadata.

20 Claims, 8 Drawing Sheets

(51) Int. Cl.
*G06F 17/30* (2006.01)
*G06Q 30/06* (2012.01)

(56) References Cited

U.S. PATENT DOCUMENTS

| | | | |
|---|---|---|---|
| 5,684,895 A | 11/1997 | Harrington | |
| 5,822,503 A * | 10/1998 | Gass, Jr. | G06T 11/001 358/1.9 |
| 6,014,125 A | 1/2000 | Herbert | |
| 6,081,276 A | 6/2000 | Delp | |
| 6,124,945 A | 9/2000 | Ishihara et al. | |
| 6,385,336 B1 | 5/2002 | Jin | |
| 6,577,759 B1 | 6/2003 | Caron et al. | |
| 7,136,074 B2 | 11/2006 | Hussie | |
| 7,444,658 B1 | 10/2008 | Matz et al. | |
| 7,801,893 B2 | 9/2010 | Gulli' et al. | |
| 8,416,255 B1 | 4/2013 | Gilra | |
| 8,553,045 B2 | 10/2013 | Skaff et al. | |
| 8,576,241 B1 * | 11/2013 | Kanter | G06F 17/3025 345/589 |
| 8,634,640 B2 | 1/2014 | Bhatti et al. | |
| 8,762,419 B2 | 6/2014 | Moroney | |
| 8,867,798 B2 | 10/2014 | Shuster | |
| 9,047,804 B1 * | 6/2015 | Moroney | G09G 5/06 |
| 9,135,719 B1 | 9/2015 | Dorner et al. | |
| 9,177,391 B1 | 11/2015 | Dorner et al. | |
| 9,245,350 B1 | 1/2016 | Dorner et al. | |
| 9,311,889 B1 | 4/2016 | Dorner et al. | |
| 9,396,560 B2 | 7/2016 | Dorner et al. | |
| 9,401,032 B1 | 7/2016 | Dorner et al. | |
| 2001/0028464 A1 | 10/2001 | Aritomi | |
| 2002/0080153 A1 | 6/2002 | Zhao et al. | |
| 2003/0004938 A1 | 1/2003 | Lawder | |
| 2003/0011612 A1 | 1/2003 | Luo et al. | |
| 2003/0142124 A1 * | 7/2003 | Takata | G11B 27/34 715/723 |
| 2003/0146925 A1 | 8/2003 | Zhao et al. | |
| 2004/0090453 A1 | 5/2004 | Jasinschi et al. | |
| 2005/0122427 A1 | 6/2005 | Hougui et al. | |
| 2005/0149411 A1 | 7/2005 | Colwell | |
| 2005/0222978 A1 | 10/2005 | Drory et al. | |
| 2006/0023082 A1 | 2/2006 | Higuchi | |
| 2006/0066629 A1 | 3/2006 | Norlander et al. | |
| 2006/0248081 A1 | 11/2006 | Lamy | |
| 2006/0250669 A1 | 11/2006 | Beretta | |
| 2006/0268120 A1 | 11/2006 | Funakura et al. | |
| 2007/0100786 A1 | 5/2007 | Moroney | |
| 2008/0003547 A1 | 1/2008 | Woolfe et al. | |
| 2008/0025629 A1 | 1/2008 | Obrador et al. | |
| 2008/0025647 A1 | 1/2008 | Obrador et al. | |
| 2008/0046410 A1 | 2/2008 | Lieb | |
| 2008/0069442 A1 | 3/2008 | Itoh | |
| 2008/0301582 A1 | 12/2008 | Gluck | |
| 2008/0317336 A1 | 12/2008 | Mojsilovic | |
| 2009/0027414 A1 | 1/2009 | Vaughn | |
| 2009/0041345 A1 | 2/2009 | Tirumalareddy et al. | |
| 2009/0055758 A1 | 2/2009 | Sim et al. | |
| 2009/0157595 A1 | 6/2009 | Gubitz | |
| 2009/0227375 A1 | 9/2009 | Weisman et al. | |
| 2009/0259567 A1 | 10/2009 | Watts | |
| 2009/0281925 A1 | 11/2009 | Winter et al. | |
| 2010/0027834 A1 | 2/2010 | Spitzig et al. | |
| 2010/0053201 A1 | 3/2010 | Klassen et al. | |
| 2010/0082654 A1 | 4/2010 | Zhang et al. | |
| 2010/0110455 A1 | 5/2010 | Woolfe | |
| 2011/0135195 A1 | 6/2011 | Marchesotti et al. | |
| 2011/0205231 A1 | 8/2011 | Hartley et al. | |
| 2011/0305386 A1 | 12/2011 | Wang et al. | |
| 2011/0319160 A1 | 12/2011 | Arn et al. | |
| 2012/0036163 A1 | 2/2012 | Myers et al. | |
| 2012/0045121 A1 | 2/2012 | Youngman et al. | |
| 2012/0075329 A1 | 3/2012 | Skaff et al. | |
| 2012/0099788 A1 | 4/2012 | Bhatti et al. | |
| 2012/0109944 A1 | 5/2012 | Hao | |
| 2012/0154420 A1 | 6/2012 | Calandrino et al. | |
| 2012/0163710 A1 | 6/2012 | Skaff et al. | |
| 2013/0013991 A1 | 1/2013 | Evans | |
| 2013/0033603 A1 | 2/2013 | Suzuki et al. | |
| 2013/0050238 A1 | 2/2013 | Bergou et al. | |
| 2013/0148741 A1 | 6/2013 | Steinberg et al. | |
| 2013/0227636 A1 | 8/2013 | Bettini et al. | |
| 2013/0235398 A1 | 9/2013 | Bhatti et al. | |
| 2013/0266217 A1 | 10/2013 | Gershon et al. | |
| 2014/0037200 A1 | 2/2014 | Phillips et al. | |
| 2014/0044349 A1 | 2/2014 | Wang et al. | |
| 2014/0049799 A1 | 2/2014 | Li et al. | |
| 2014/0052584 A1 | 2/2014 | Gershon et al. | |
| 2014/0067014 A1 | 3/2014 | Kaula et al. | |
| 2014/0089781 A1 * | 3/2014 | Hoguet | G06F 17/211 715/234 |
| 2014/0153821 A1 | 6/2014 | Masuko et al. | |
| 2014/0177952 A1 | 6/2014 | Masuko | |
| 2014/0189476 A1 | 7/2014 | Berthelot et al. | |
| 2014/0300775 A1 | 10/2014 | Fan et al. | |
| 2014/0334722 A1 | 11/2014 | Bloore et al. | |
| 2014/0355874 A1 | 12/2014 | Sakamaki et al. | |
| 2015/0235110 A1 | 8/2015 | Curtis et al. | |
| 2015/0235389 A1 | 8/2015 | Miller et al. | |
| 2015/0262549 A1 | 9/2015 | Moroney | |
| 2015/0269747 A1 | 9/2015 | Hogan et al. | |
| 2015/0324392 A1 | 11/2015 | Becker et al. | |
| 2015/0332479 A1 | 11/2015 | Gershon et al. | |
| 2015/0378999 A1 | 12/2015 | Dorner et al. | |
| 2015/0379000 A1 | 12/2015 | Haitani et al. | |
| 2015/0379001 A1 | 12/2015 | Gunningham et al. | |
| 2015/0379002 A1 | 12/2015 | Dorner et al. | |
| 2015/0379003 A1 | 12/2015 | Dorner et al. | |
| 2015/0379004 A1 | 12/2015 | Sayre et al. | |
| 2015/0379005 A1 | 12/2015 | Dorner et al. | |
| 2015/0379006 A1 | 12/2015 | Dorner et al. | |
| 2015/0379071 A1 | 12/2015 | Dorner et al. | |
| 2015/0379608 A1 | 12/2015 | Dorner et al. | |
| 2015/0379731 A1 | 12/2015 | Dorner et al. | |
| 2015/0379732 A1 | 12/2015 | Sayre et al. | |
| 2015/0379733 A1 | 12/2015 | Dorner et al. | |
| 2015/0379739 A1 | 12/2015 | Dorner et al. | |
| 2015/0379743 A1 | 12/2015 | Dorner et al. | |
| 2015/0379959 A1 | 12/2015 | Dorner et al. | |
| 2016/0005188 A1 | 1/2016 | Dorner et al. | |
| 2016/0005201 A1 | 1/2016 | Kunkel et al. | |
| 2016/0104303 A1 | 4/2016 | Dorner et al. | |
| 2016/0335784 A1 | 11/2016 | Dorner et al. | |

FOREIGN PATENT DOCUMENTS

| | | |
|---|---|---|
| WO | WO 2015/200502 A1 | 12/2015 |
| WO | WO 2015/200505 A1 | 12/2015 |
| WO | WO 2015/200509 A1 | 12/2015 |
| WO | WO 2015/200515 A1 | 12/2015 |
| WO | WO 2015/200523 A1 | 12/2015 |

OTHER PUBLICATIONS

Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.

Csurka, Gabriela, et al.; "Learning moods and emotions from color combinations," Proceedings of the Seventh Indian Conference on Computer Vision, Graphics and Image Processing, pp. 298-305; New York; Dec. 12, 2010.

Das et al., "Indexing flowers by color names using domain knowledge-driven segmentation," Proc. The Fourth IEEE Workshop on Applications of Computer Vision; pp. 94-99; 1998.

Dorner, C.S., Automatic Image-Based Recommendations Using a Color Palette, U.S. Appl. No. 14/316,268, filed Jun. 26, 2014.

Global Color Survey, http://www.colorcom.com/global-color-survey, Feb. 1, 2001, accessed Sep. 11, 2015.

Heer, Jeffrey, et al.; "Color naming models for color selection, image editing and palette design," Proceedings of the 2012 ACM Annual Conference on Human Factors in Computing Systems, pp. 1007-1016; New York; May 5, 2012.

(56) References Cited

OTHER PUBLICATIONS

Lawder, Jonathan, "The Application of Space-filling Curves to the Storage and Retrieval of Multi-dimensional Data," PhD thesis; Sections 4.3.5.1, p. 68, and 6.5, pp. 121-130; Jan. 1, 2000.

Tremeau et al., "A vector quantization algorithm based on the nearest neighbor of the furthest color," Proceedings of International Conference on Image Processing, vol. 3, pp. 682-685, Oct. 26-29, 1997.

Tropf, H. et al., "Multidimensional range search in dynamically balanced trees," Angewandte Informatik (Applied Informatics), pp. 71-77; Braunschweig, Germany; Feb. 1, 1981.

Wang et al., "Contextual Dominant Color Name Extraction for Web Image Search," 2012 IEEE International Conference on Multimedia and Expo Workshops (ICMEW), pp. 319-324.

Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.

International Search Report and Written Opinion in PCT/US2015/037469 mailed on Oct. 1, 2015.

International Search Report and Written Opinion in PCT/US2015/037456 mailed on Sep. 9, 2015.

International Search Report and Written Opinion in PCT/US2015/037465 mailed on Oct. 27, 2015.

International Search Report and Written Opinion in PCT/US2015/037481 mailed on Sep. 14, 2015.

U.S. Appl. No. 14/316,483, filed Jun. 26, 2014, Dorner et al.

Bell, E., Color Detection: Technology on Heels with Lyst Engineering, dated Feb. 22, 2014, retrieved Apr. 7, 2014, <http://developers.lyst.com/data/images/2014/02/22/color-detection/>.

Luo et al., "Novel color palettization scheme for preserving important colors," Proc. SPIE. 5008. Color Imaging VIII: Processing, Hardcopy, and Applications; Jan. 20, 2003.

Montagne et al., "Adaptive color quantization using the baker's transformation," J. Electronic Imaging 15(2); Apr. 2006.

Periasamy et al.; "A Common Palette Creation Algorithm for Multiple Images with Transparency Information," IEEE 2009 Int'l Conf. on Advances in Computing, Control, and Telecommunication Technologies.

Yu et al., "Contextual algorithm for color quantization," J. Electronic Imaging 12(3); Jul. 2003.

International Search Report and Written Opinion of the International Searching Authority, mailed Sep. 14, 2015, for PCT Application No. PCT/US2015/037494; 11 pp.

Balasubramanian, Raja, et al.; Sequential Scalar Quantization of Color Images, Journal of Electronic Imaging, vol. 3, No. 1, pp. 45-59; Jan. 1994.

Color Blind Assistant, iPhone Apps Versions 2.61 and 2.62, release date Oct. 14-15, 2009, pp. 1-7.

Color Name & Hue, Wayback Machine Archive, May 16, 2013, pp. 1-17, <http://web.archive.org/web/20130516202647/http://www.color-blindness.com/color-name-hue>.

Das et al, Indexing Flower Patent Images Using Domain Knowledge, IEEE Intelligent Systems, vol. 14, No. 5; 1999, pp. 24-33.

Delon, J., et al., Automatic Color Palette, Proceedings of the International Conference on Image Processing, vol. 2, Sep. 11-14, 2005, pp. 706-709.

HTML Color Picker, Wayback Machine Archive, Feb. 15, 2013, 1 page, <http://web.archive.org/web/20130215181242/http://imagecolorpicker.com/>.

Nickerson, D., et al., Central Notations for ISCC-NBS Color Names, Journal of the Optical Society of America, vol. 31, pp. 587-591, Sep. 1941.

Tin Eye Labs, Wayback Machine Archive, Sep. 20, 2012, pp. 1-3, <http://web.archive.org/web/20120920051712/http://labs.tineye.com/color/>.

\* cited by examiner

AUTOMATIC COLOR PALETTE BASED RECOMMENDATIONS

BACKGROUND

In many computing centric commerce models, users are able to efficiently view and purchase a wide variety of items over computer networks. In many scenarios, a particular network resource, such as a commerce network site, can present items (e.g., goods and/or services) associated with different colors. The items may be depicted in photographs or other images presented via the network site.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
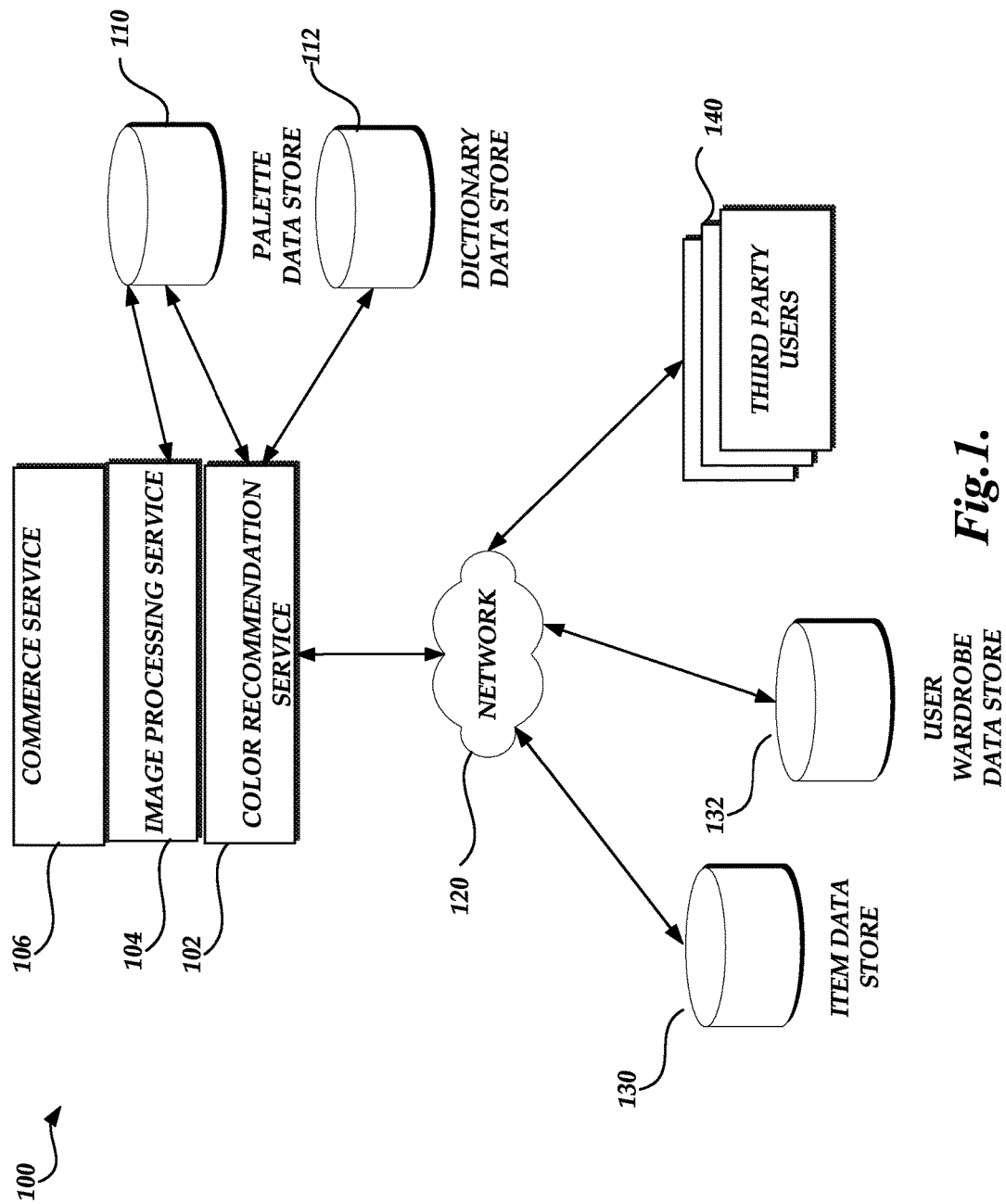
FIG. 1 is a block diagram illustrating an embodiment of an operating environment including an image processing service for palette generation based on color images, and a color recommendation service.

Generally described, the present disclosure corresponds to methods and systems for providing color-related item recommendations and color identification validation. Often, a user visiting a network site, such as a Website, may wish to locate an item of a particular type and of a particular color. In certain instances, users visiting the site may wish to locate an accessory or other item having a color that coordinates with a specified item, such as an item of clothing, furniture, appliances, housewares, etc. In other instances, a user may want to know what colored items of clothing the user already has would go well with each other as part of an outfit. In certain instances, a merchandiser may want to assemble a set of coordinating items from a catalog of items. In addition, it may be useful to validate image metadata, such as color names, to ensure that the metadata accurately corresponds to the image.

One or more of the various use cases discussed above are addressed by one or more embodiments disclosed herein. Aspects of the present disclosure relate to generating color-related recommendations and to utilizing image-derived color palettes, which are collections of representative colors each optionally associated with weight or other metadata, in generating recommendations. Additional aspects of the present disclosure validate metadata associated with an image and/or generate metadata, such as color names, for an image.

In accordance with an illustrative embodiment, an image processing service obtains a color image depicting one or more items, a design, a scene, or the like, and generates one or more color palettes based on palette generation criteria. The palette generation criteria can be inputted by a user, a host of a commerce network site or other network site, a merchandise provider or vendor, or the like. Alternatively, or in addition, the palate generation criteria can be automatically generated by a computing device or system. The palette generation criteria may indicate various preferences, factors, parameters, thresholds, or requirements that facilitate or control a palette generation process.

Illustratively, the palette generation process may include various elements such as image pre-processing, color distribution generation, representative color identification, palette candidate generation, and/or palette determination. For example, the color image can be pre-processed prior to the generation of color distribution or identification of representative colors. The pre-processing can include de-noising, normalization, down sampling, area-marking, or the like. A color distribution can be generated based on color values corresponding to each pixel of a color image. Representative colors can then be identified based on the color distribution. For example, colors that are most distant from one another as measured by a certain color distance formula(e) can be identified as representative colors. One or more thresholds can be utilized in the identification of representative colors to facilitate color merging or weighting. The identified representative colors with associated weight or other metadata may constitute a palette candidate corresponding to specific threshold settings as indicated by palette generation criteria. In some embodiments, multiple palette candidates can be generated by changing the threshold settings. A palette may be used as color fingerprint for a given item, and so may be used to identify the item using color-related search terms. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

Overview of an Example Embodiment

FIG. 1 illustrates an embodiment of a color recommendation processing environment 100 that can implement the features described herein in the context of an example color recommendation service 102. In some embodiments, the color recommendation processing environment 100 includes the color recommendation service 102, an image processing service 104, a commerce service 106, a palette data store 110, a dictionary data store 112, a network 120, an item data store 130, a user wardrobe data store 132, and third party users 140. In some embodiments, various components of the recommendation processing environment 100 are communicatively interconnected with one another via the network 120. The recommendation processing environment 100 may include different components, a greater or fewer number of components, and can be structured differently. For example, there can be more than one data store or other computing devices in connection with the color recommendation service 102. As another example, components of the recommendation processing environment 100 may communicate with one another, with or without the network 120.

The image processing service 104 can correspond to any system capable of performing the associated processes described herein. The image processing service 104 may be implemented by one or more computing devices. For example, the image processing service 104 may be implemented by computing devices that include one or more processors to execute one or more instructions, memory, and communication devices to transmit and receive data over the network 120. In some embodiments, the image processing service 104 is implemented on one or more backend servers capable of communicating over a network. In other embodiments, the image processing service 104 is implemented by one or more virtual machines in a hosted computing environment (e.g., a "cloud" computing environment). The hosted computing environment may include one or more provisioned and released computing resources, which computing resources may include computing, networking or storage devices.

In one aspect, the image processing service 104 can correspond to one or more applications that perform, individually or in combination, the image processing functions described herein, including image pre-processing, color distribution generation, representative color identification, palette candidate generation, palette determination, etc. In another aspect, the image processing service 104 may be configured to store or update palettes at the palette data store 110. In some embodiments, the image processing service 104 is associated with a network or network-based merchandise provider or vendor. The image processing service 104 may access and process images from the item data store 102. In some embodiments, the images are provided by merchandisers or other parties for posting on an commerce network site, for example, on a network page (e.g., a Web page) presenting details regarding a particular item(s) (an "item detail page") and from which consumers can purchase the item. In yet other embodiments the images are provided by consumers, provided by third party image data stores, or provided by other image sources. In the illustrated embodiment, the image processing service 104 is communicatively connected to the palette data store 110.

The color recommendation service 102 can correspond to any system capable of performing the processes described herein. The color recommendation service 102 may be implemented by one or more computing devices. For example, the color recommendation service 102 may be implemented by computing devices that include one or more processors to execute one or more instructions, memory, and communication devices to transmit and receive data over the network 120. In some embodiments, the color recommendation service 102 is implemented on one or more backend servers capable of communicating over a network. In other embodiments, the color recommendation service 102 is implemented by one or more virtual machines in a hosted computing environment. The hosted computing environment may include one or more provisioned and released computing resources, which computing resources may include computing, networking or storage devices.

In one aspect, the color recommendation service 102 can correspond to one or more applications that perform, individually or in combination, the recommendation functions described herein, including recommending a color, recommending a color palette, recommending an item of a specified color, recommending items that coordinate with a user specified item, recommending sets of color coordinated items, recommending items of selected colors based on user textual and/or image-based search queries, etc. Recommendations may include item category recommendations, brand-related recommendations, price-related recommendations, etc. In another aspect, the color recommendation service 102 may be configured to identify color trends and utilize such trends to provide recommendations. In some embodiments, the color recommendation service 102 is associated with a network or network-based merchandise provider or vendor.

The color recommendation service 102 is communicatively connected to the palette data store 110 and the dictionary data store 112. The palette data store 110 can generally include any repository, database, or information storage system that can store palette data and associated metadata. The dictionary data store 112 can generally include any repository, database, or information storage system that can store dictionaries, such as dictionaries that may be used to parse queries, identify keywords, or determine coordinating items, as discussed elsewhere herein.

The palette data stored in the palette data store 110 can be collections of colors, including collections of colors generated by a user and/or system based at least in part on human color preferences, optionally with associated weight(s) and date(s) of creation. Palette data can be of various formats, such as lists, vectors, arrays, matrices, etc. Metadata may optionally be associated with individual palettes, for purposes of textually indicating the color(s) included in the palette using color names or other identifiers, and optionally indicating their format, tags, associations, sources, popularity, date(s)/time(s) of creation/editing, geolocation data, last update time, semantics, features, conditions, associated demographics (e.g., geographical region, age, gender, ethnic group, religion, culture, language, dialect, etc. of users that provided input used in creating the palette), or the like. The color palettes may have been ranked or voted on by people to indicate which combinations of colors are more preferable, visually appealing, popular, or the like. Such ranking and/or votes may be stored and may be used to weight color palettes. An example process of generating color palettes is discussed in greater detail below.

Using an initial color or colors, an ordered list of affiliated colors can be generated where a given affiliated color is ranked based at least in part on the popularity of the combination of the initial color or colors with that affiliated color. The color palette can be built by adding an affiliated color to the colors in the palette and then updating the list of affiliated colors to suggest new affiliated colors to add to the updated palette. The resulting color palette can be configured to contain a combination of colors that is visually appealing or preferable because each affiliated color used in generating the color palette has been determined by the community of people to be an appropriate or preferable color companion to the color or colors already in the palette. The palettes generated using the affiliated color process may be used to provide color-related recommendations for colors or colored items that would go well with another color or colored item. For more details on generating a weighted or ordered list of affiliated colors or generating a color palette using affiliated colors, see application U.S. patent application Ser. No. 14/316,292, entitled "BUILDING A PALETTE OF COLORS BASED ON HUMAN COLOR PREFERENCES," filed on Jun. 26, 2014, and U.S. patent application Ser. No. 14/316,442, entitled "BUILDING A PALETTE OF COLORS FROM A PLURALITY OF COLORS BASED ON HUMAN COLOR PREFERENCES," filed on Jun. 26, 2014, each of which is incorporated by reference herein in its entirety. Particular color palettes may be associated with a particular community that includes a biased population (e.g., that are related based on geographical region, age, gender, ethnic group, preferences, social network, etc.). This enables providing recommended colors to users that have a known and/or inferred bias that corresponds to a palette of a community associated with such color palette bias.

In some embodiments, a first color can be selected by a program or a user and a plurality of palettes can be identified from a data store of color palettes containing that color (or a sufficiently similar color). From those palettes, a list of affiliated colors can be generated by identifying the other colors in the palettes. For each affiliated color in the list, a weight can be assigned based on the ranking, rating, and/or number of votes the containing palette has received. The list of affiliated colors can be sorted based on the assigned weights. The program or user can select an affiliated color from the sorted list to add to a custom color palette containing the initial color. When the selected affiliated color is added to the palette, a new list of affiliated colors can be generated based at least in part on the colors in the palette that allows the program or user to continue to build the color palette. For more example details on extracting colors from an image, see application U.S. patent application Ser. No. 14/316,483, entitled "IMAGE-BASED COLOR PALETTE GENERATION," filed on Jun. 26, 2014, which is incorporated by reference herein in its entirety.

The commerce service 106 may provide an electronic catalog to which third party users 140 may be provided access via respective user devices. For example, the commerce service 106 may provide item detail pages. A given item detail page may include detailed information regarding an item (e.g., an item being offered for sale), such as one or more images, descriptive text, color name(s), a price, weight, size options, reviews of the item by other users or by professional reviewers, alternative similar items, and/or other information. The item detail page may also include controls via which the user can select among various versions of the item (e.g., size, color, etc.), and a purchase control via which the user can initiate purchase of the item (e.g., by adding the item to a shopping cart). The commerce service 106 may also provide third party users 140 with interfaces via which the user can request recommendations and submit queries, such as color-related recommendations and search queries.

While a commerce environment is often used as an example herein, it will be appreciated that the color recommendation service 102 and/or image processing service 104, as disclosed herein, may be used in a variety of environments other than a commerce environment. For example, aspects of the present disclosure, in some embodiments, may be used and/or implemented to efficiently recommend colors and color palettes to consumers, merchandisers, designers, architects, artists, landscapers, developers, gamers, students, etc. for virtually any purpose. Without limitation, aspects of the present disclosure may be used for efficient generation of color-based recommendations for use in social networking contexts, digital photo albums, digital news articles, artistic works, content generation, design/architectural drawings, etc., just to name a few practical, non-limiting examples.

The network 120 may include any suitable combination of networking hardware and protocols necessary to establish communications within the color recommendation processing environment 100. For example, the network 120 may include private networks such as local area networks (LANs) or wide area networks (WANs) as well as public or private wireless networks, satellite networks, cable networks, cellular networks, or the Internet. In such an embodiment, the network 120 may include hardware (e.g., modems, routers, switches, load balancers, proxy servers, etc.) and software (e.g., protocol stacks, accounting software, firewall/security software, etc.) that establish networking links within the color recommendation processing environment 100. Additionally, the network 120 may implement one of various communication protocols for transmitting data between components of the color recommendation processing environment 100.

The item data store 130 may correspond to or be associated with one or more sites and systems, such as a commerce network site providing the commerce service 106 and the color recommendation service, and/or third party merchandise providers or vendors that may market items via the commerce service 106. The item data store 130 may be associated with any computing device(s) that can facilitate communication with the color recommendation service 102 and the commerce service 106 via the network 120. Such computing devices can generally include servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

The item data store 130 may have metadata/keywords that identify and/or describe the respective items. By way of example, the item data store 130 may store item records for respective items in one or more electronic catalogs including unique item identifiers, such as Universal Product Codes (UPC), European Article Numbers (EAN), International Standard Book Numbers (ISBN), and/or other identifiers. By way of further example, the item metadata may indicate the item type and/or category, such as "dress" and "clothing," or "blender" and "kitchen appliance." In addition, the item metadata may include text or another identifier (sometimes referred to herein as a "color name") identifying one or more colors of the item or of versions of the item, such as "red," "orange," "blue," etc. The metadata may further include such information as brand. Other data, such as price, may be included as metadata or otherwise made accessible. Still further, a given item record may include one or more images of the item, where the image may be associated with metadata (e.g., identifying items in the image by item type, item category, unique identifier, identifying associated color palettes, etc.). Certain keywords may not identify a color explicitly, but may be suggestive of a color (e.g., "summery," "formal," "wintery," etc.). Item record data may have been provided by an operator of a commerce site, by consumers, merchandisers, vendors, third party data stores, artists, designers, color providers, and/or other sources.

The user wardrobe data store 132 may store images of wardrobe items of users (and associated metadata) in respective user accounts. For example, a user may take images, e.g., photographs and/or videos, of the user's wardrobe (e.g., dresses, shoes, blouses, pants, socks, other items of clothing, handbags, briefcases, earrings, necklaces, other jewelry, other accessories, etc.), and upload the images to the user wardrobe data store 132 (which may be maintained in hosted computing environment). The user may have manually provided metadata to be stored in association with the images (e.g., color, item type, item category, item identifiers, and/or other identifiers, etc.). Alternatively or in addition, the color recommendation service 102 or other service may have automatically recognized (via an object identification module) the item(s) and its associated color(s) in a given user image, and stored such information as metadata in association with the given user image.

Third party users 140 may correspond to visitors to a network site (e.g., a commerce network site providing commerce service 106), such as consumers, designers, architects, or the like, and can be associated with any computing device(s) that can facilitate communication with the color recommendation service 102 via the network 120. Such computing devices can generally include wireless mobile devices (e.g., smart phones, PDAs, tablets, wearable computing devices, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

One skilled in the relevant art will appreciate that the example components and configurations provided in FIG. 1 are illustrative in nature. Accordingly, additional or alternative components and/or configurations, especially regarding the additional components, systems and subsystems for facilitating functions disclosed herein may be utilized.

Figure 2:
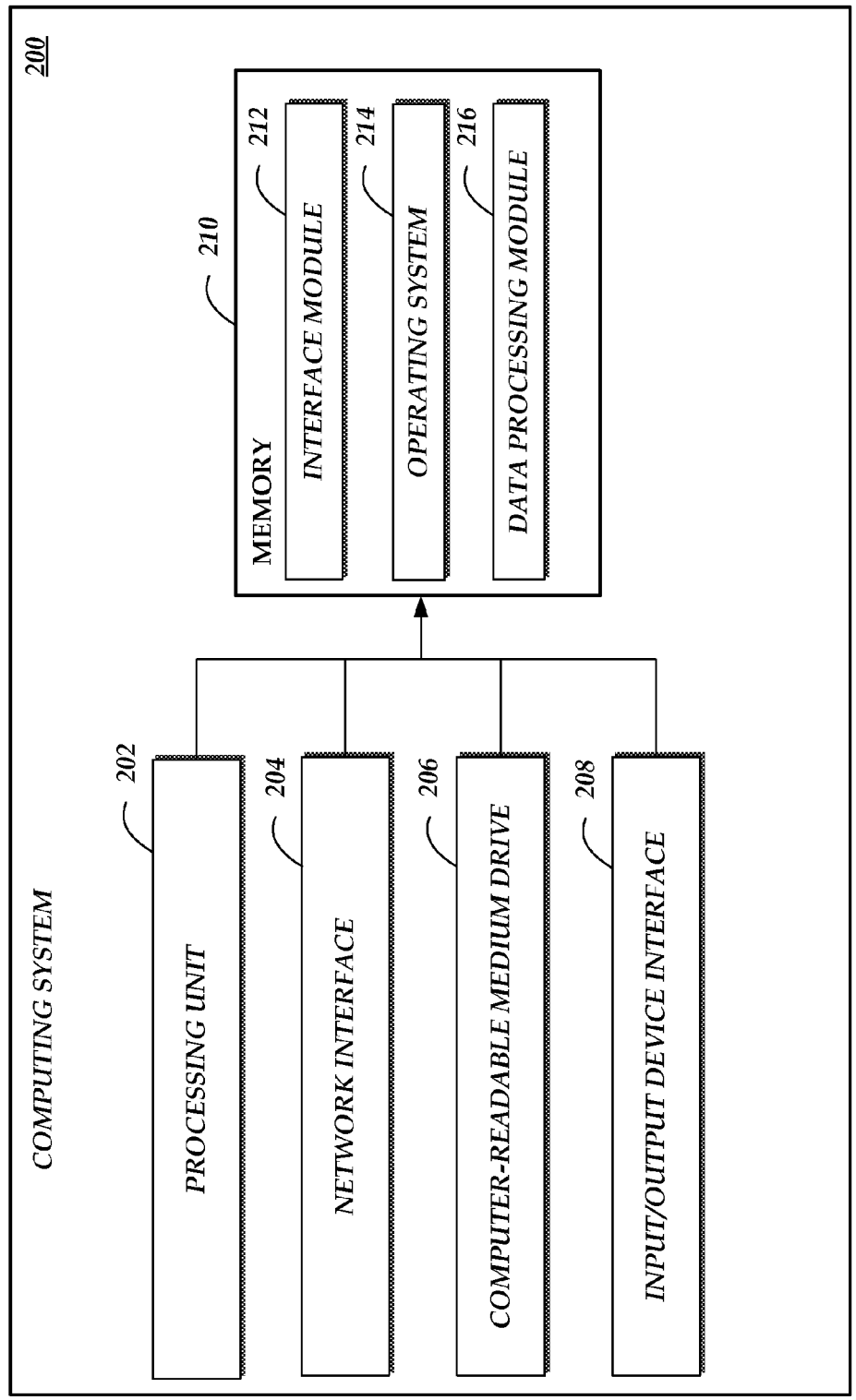
FIG. 2 is a block diagram illustrating an embodiment of example components of a computing system capable of providing the image processing service and/or color recommendation service shown in FIG. 1.

FIG. 2 is a block diagram illustrating an embodiment of example components of a computing system 200 providing one or more of a color recommendation service 102, an image processing service 104, or a commerce service 106, utilized in accordance with the color recommendation processing environment 100 of FIG. 1. The example computing system 200 includes an arrangement of computer hardware and software components that may be used to implement aspects of the present disclosure. Those skilled in the art will appreciate that the example components may include more (or fewer) components than those depicted in FIG. 2. It is not necessary, however, that all of these generally conventional components be shown in order to provide an enabling disclosure.

The computing system 200 may include a processing unit 202, a network interface 204, a non-transitory computer-readable medium drive 206, and an input/output device interface 208, all of which may communicate with one another by way of a communication bus. The network interface 204 may provide the color recommendation service 102, the image processing service 104, and/or the commerce service 106 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more embodiments of the present disclosure. The memory 210 generally includes RAM, ROM and/or other persistent or non-transitory computer-readable storage media. The memory 210 may store an operating system 214 that provides computer program instructions for use by the processing unit 202 in the general administration and operation of the color recommendation service 102. The memory 210 may further include other information for implementing aspects of the present disclosure.

In an example embodiment, the memory 210 includes an interface module 212. The interface module 212 can be configured to facilitate generating one or more user interfaces through which an item data store 130 or a third party user 140, utilizing a compatible computing device, may send to, or receive from, the color recommendation service 102 recommendations, image data, palette data, instruction data, metadata, etc., or otherwise communicate with the color recommendation service 102. Specifically, the interface module 212 can be configured to facilitate processing functions described herein, including recommending a color, recommending a color palette, recommending an item of a specified color, recommending items that coordinate with a user specified item, recommending an assemblage of coordinating items (e.g., clothing, furniture, appliances, housewares, linen, etc.) in coordinating colors, recommending items of selected colors based on user textual search queries, validating metadata, processing purchase transactions, etc.

For example, a third party user 140 may submit a color-related recommendation query or selection and the color recommendation service 102 may access the item data store 130, which may provide data used to satisfy the query or selection, including item images, item colors, item categories, item descriptions, item prices, etc. The third party user may submit queries or selections and receive recommendations via one or more generated user interfaces. The user interface can be implemented as a graphical user interface (GUI), Web-based user interface, computer program, smartphone or tablet program or application, touchscreen, wearable computing device interface, command line interface, gesture, voice, or text interface, etc., or any combination thereof.

In addition, the memory 210 may include a data processing module 216 that may be executed by the processing unit 202. In an example embodiment, the data processing module 216 implements aspects of the present disclosure. For example, the data processing module 216 can be configured to process user queries, instructions, item data from the item data store 130, palette data from the palette data store 110, or metadata to generate color-related recommendations or validate image metadata.

It should be noted that the image processing service 104, color recommendation service 102, and commerce service 106 may be implemented by some or all of the components present in the computing system 200 as discussed herein with respect to FIG. 2. In addition, the color recommendation service 102 may include additional components not present in FIG. 2. The modules or components described above may also include additional modules or be implemented by computing devices that may not be depicted in FIG. 1 or 2. For example, although the interface module 212 and the data processing module 216 are identified in FIG. 2 as single modules, one skilled in the relevant art will appreciate that the modules may be implemented by two or more modules and in a distributed manner. As another example, the computing system 200 and its components can be implemented by network servers, application servers, database servers, combinations of the same, or the like, configured to facilitate data transmission to and from item data store 130, third party users 140, or other image sources, via network 120. Accordingly, the depictions of the modules are illustrative in nature.

Several example routines will now be described with reference to the figures. It is understood that more than one of the routines or portions thereof may be utilized to generate and provide recommendations in response to a given user query, selection, or other input.

Figure 3:
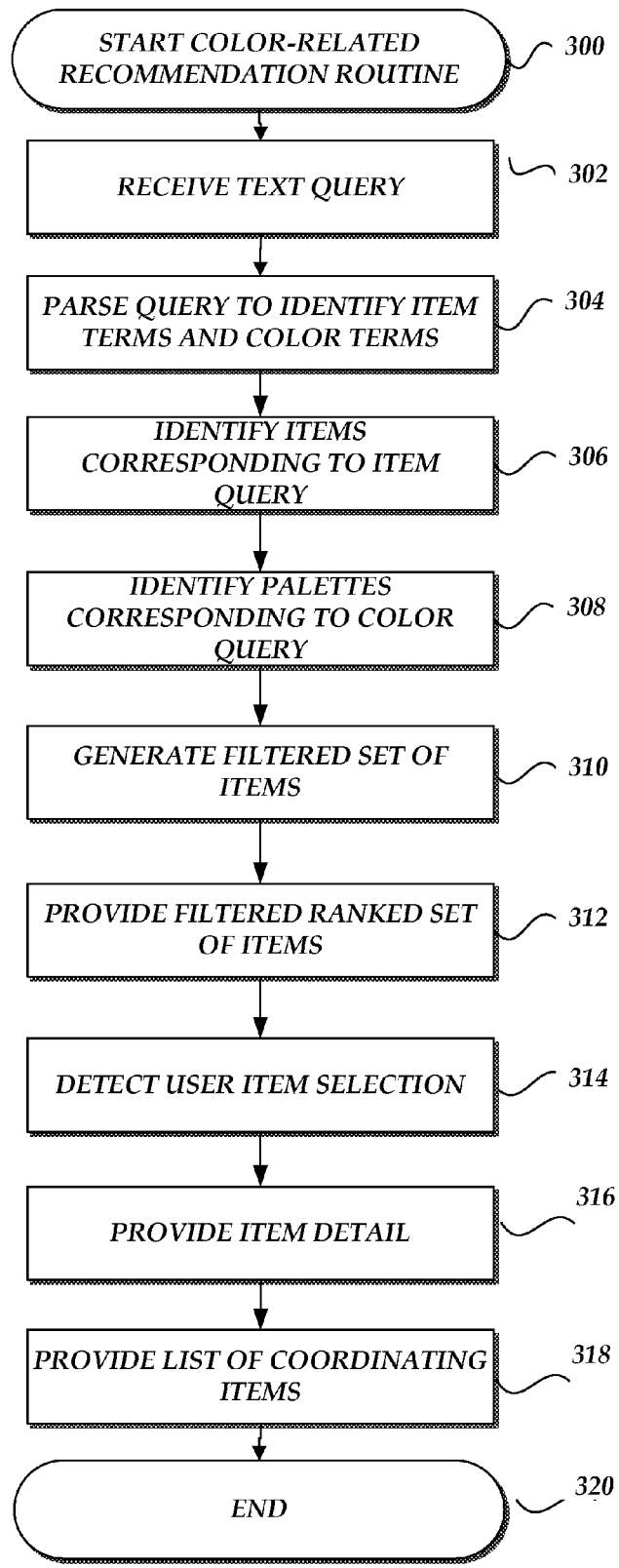
FIG. 3 is a flow diagram illustrating an embodiment of a routine implemented by the color recommendation service to provide recommendations in response to a color query.

Example Recommendation Process to Generate Color-Related Recommendations in Response to a Text Query Including a Color FIG. 3 illustrates a flow diagram of an example routine performed by color recommendation service 102 for generating a color-related recommendation at least partly in response to a text-based color query (where the text query may comprise user-entered text or a selection of text by the user from a menu or otherwise, and the query includes a color name). The color recommendation service 102 begins the routine at block 300. At block 302, a text-based color query is received by the color recommendation service 102 from a user via a user device. The text-based color query may specify an item type (e.g., dress, blender, couch, or other specific item type) or category (e.g., clothing, appliance, furniture, etc.), and a color (e.g., red, blue, orange, etc.). The query may also include other terms or filters (e.g., entered as text, selected from a menu, or otherwise provided), such as a price range, desired brands, etc., where the user is looking for recommendations of items corresponding to such terms or filters.

At block 304, the color recommendation service 102 may parse the user text-based color query to identify items that correspond to item type and/or category, and terms that correspond to color. For example, if the query is "red dress," the color recommendation service 102 may use a dictionary, such as dictionary data store 112, to determine that the term "red" is a color and that the term "dress" is an item type.

At block 306, the color recommendation service 102 may access the item data store 130, which may correspond to an electronic catalog of items, to identify items corresponding to the item type or category. For example, item records in the item data store 130 may have tags or other metadata/keywords that identify and/or describe the respective items. By way of example, the item data store 130 may store item records for respective items in one or more electronic catalogs including item identifiers. By way of further example, the item metadata may indicate the item type and/or category, such as "dress" and "clothing," or "blender" and "kitchen appliance." In addition, the item metadata may include text or other metadata identifying one or more colors of the item or of versions of the item, such as the color names "red," "orange," "blue," etc. The metadata may further include such information as brand. Other data, such as price, may be included as metadata or otherwise accessed. Still further, a given item record may include one or more images of the item. Item record data may have been provided by an operator of a commerce site, by consumers, third party databases, and/or other sources. The color recommendation service 102 may compare the user text-based color query with item metadata or other data to identify items that correspond to the query. The color recommendation service 102 may store a temporary record of the matching items (e.g., by storing a list of corresponding item identifiers). The color recommendation service 102 may rank the matching items in accordance with the closeness of the match to the query to provide an item relevancy ranking. Optionally or in addition, a user's preferences may be used in ranking matching items. By way of example, the user's preferences may be determined based on the user's purchase or browse history (which may indicate the colors of items purchased or browsed by the user), items already in the user's wardrobe (e.g., as may be determined from the user wardrobe database 132), prior user color-related search queries, or preferences explicitly provided by the user via a preference form or otherwise.

At block 308, the color recommendation service 102 identifies one or more color palettes that correspond to the identified color included in the query. For example, the color recommendation service 102 may compare the identified color or colors in the query with metadata (e.g., color names) associated with palettes stored in the palette data store 110 to identify matching or relevant palettes. The identified palettes may be ranked in accordance with a determination as to how closely a given palette corresponds to the color in the query. For example, palettes may have an assigned weight indicating which is the most dominant color (where a color may or may not be a shade of a color), the second most dominant color, and so on. Optionally, only palettes within a certain range of the color in the query or only a specified maximum number of palettes will be identified (e.g., the 10 closest palettes). Other factors may be taken into account in weighting palettes. For example, attitudes and perceptions of colors, and what colors coordinate with what colors, may change over time, based on gender, geographic region, ethnic group, age, etc. Thus, the palette weighting may be based at least in part on one or more of the palette date, and optionally on one or more of the user's gender, geographic region, ethnic group, age, palette popularity trends, etc.

At block 310, the color recommendation service 102 filters the matching items from block 306 to filter out items whose color(s) do not sufficiently match the color in the query. For example, the color recommendation service 102 may determine from metadata associated with the matched items from block 306 whether they sufficiently match the palettes identified at block 308. Optionally, the color recommendation service 102 may rank the filtered list according to the ranking of matching items performed at block 306. As yet another option, the color recommendation service 102 may rank the filtered list according to the ranking of closeness of the item color to the color query. As yet a further option, some combination of the ranking of matching items performed at block 306 and a ranking based on the closeness of the item color to the color query may be used to generate a further relevancy ranking of items.

At block 312, the filtered list or the ranked filtered list is provided for display on the user device (e.g., via a browser installed on the user device, via a dedicated application such as a mobile device app, or otherwise) as recommended items based at least in part on the user's query. The provided list may be in the form of only images of the matching items, where the images may be retrieved from the item data store 130. The provided list may be in the form of only text identifying and/or describing the matching items, where the text may be retrieved from the item data store 130. The provided list may be in the form of both images of the matching items and corresponding text retrieved from the item data store 130. Optionally, controls may be provided to the user for use in indicating that a larger or a smaller number of matching items are to be presented. In response, the color recommendation service 102 may accordingly modify the number of items presented to the user. For example, if the user indicates that fewer items are to be presented to the user, the color recommendation service 102 may present the higher ranked items and not present a number of lower ranked items that had previously been presented.

At block 314, a determination is made as to whether the user has selected an item in the list of items. If the user has selected an item, at block 316, an item detail page is provided for display on the user device. The item detail page may include detailed information regarding the item, such as one or more images, descriptive text, color name(s), a price, weight, size options, reviews of the item by other users or by professional reviewers, alternative similar items, and/or other information. The item detail page may also include controls via which the user can select among various versions of the item (e.g., size, color, etc.), and a purchase control via which the user can initiate purchase of the item. A control may also be provided via which the user can cause the list of matching items to be again presented to the user.

Optionally, the color recommendation service 102 may utilize metadata associated with the item selected by the user to identify similar and/or coordinating items to the user. For example, the color recommendation service 102 may utilize color information associated with the selected item (e.g., associated with the image of the selected item), the item type information, and/or the item categorization information to identify related and/or coordinating items. For example, if the user selected a dress having a palette with a deep shade of red as the primary color, at block 318 the color recommendation service 102 may identify and present items having a similar palette with deep red as a primary color and/or having a coordinating color palette (an affiliated color) different than the primary color of the item. By way of further example, the color recommendation service 102 may identify item accessories (e.g., a scarf, earrings, handbag, etc.) whose color(s) coordinate with the selected dress. The color recommendation service 102 may further select a coordinating item or filter affiliated color item candidates by applying heuristics based on item taxonomy. Optionally, the color recommendation service 102 may identify item accessories or coordinating items in response to a user query (e.g., where the user provides or selects an additional item type or item category query). The identification of similar items and/or coordinating items based on a user selection of an item image (or of an item with an associated image) is discussed in greater detail below with reference to FIG. 4. The color recommendation service 102 ends the routine at block 320.

By way of further example, a user may want to build an outfit based on the color blue. The user may submit a query "blue outfit." The color recommendation service 102 may parse the query and determine that "blue" is a color and "outfit" is an assemblage of clothing items, optionally including accessories. Based on the queried color, the color recommendation service 102 can determine, from the palette data store 110, an ordered list of affiliated colors (e.g., which have been determined by a community of users, through an algorithm, or otherwise to go well with the color in the query). The color recommendation service 102 may then identify clothing items having the queried color and affiliated colors, and assemble one or more outfits accordingly. Items in a given assembled outfit may be presented to the user as a set to indicate that the items in the set are part of the same recommended outfit.

Figure 4:
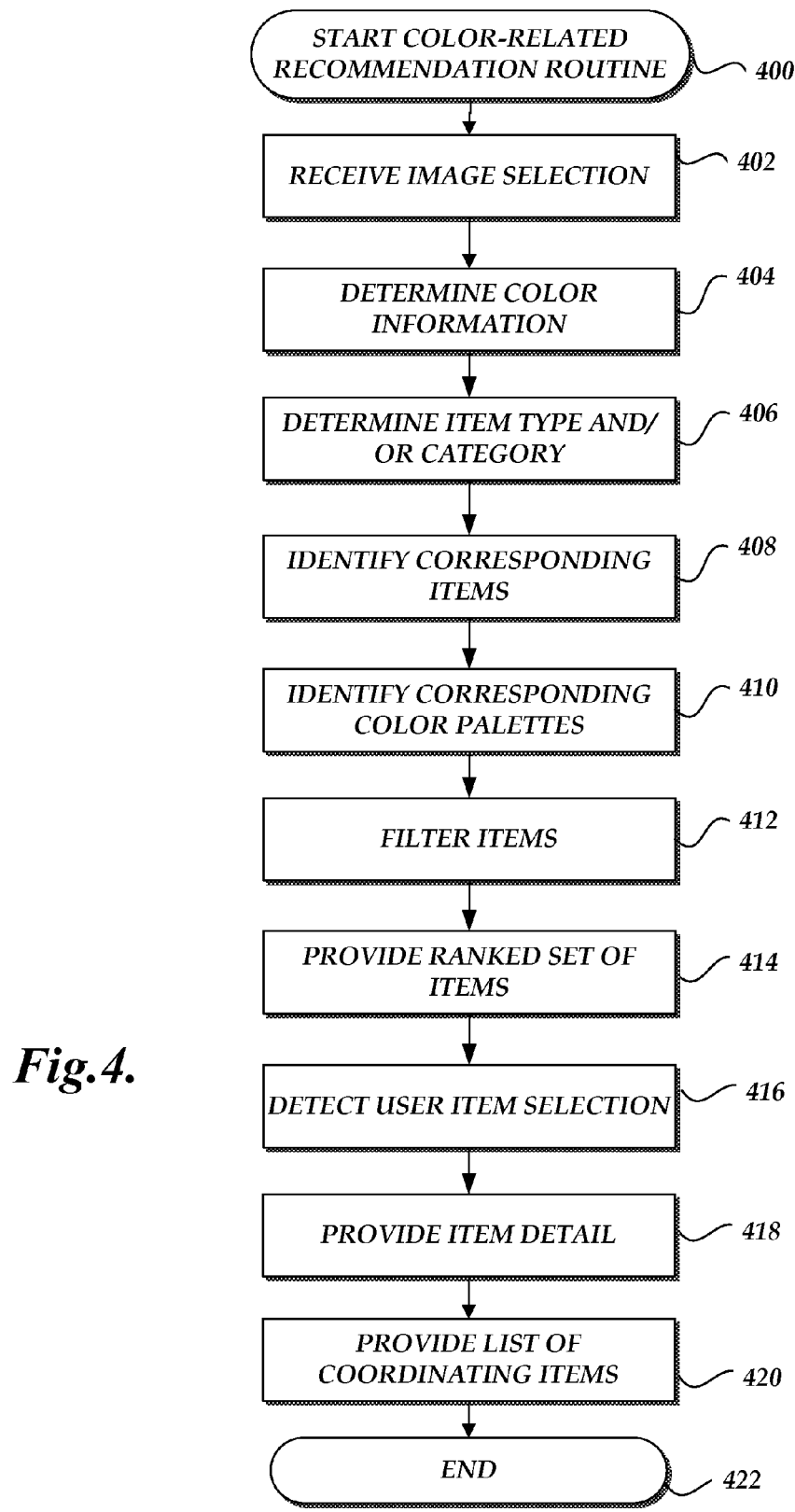
FIG. 4 is a flow diagram illustrating an embodiment of a routine implemented by the color recommendation service to provide recommendations in response to an image selection.

Example Recommendation Process to Generate Color-Related Recommendations in Response to an Image Selection FIG. 4 illustrates a flow diagram of an example routine performed by color recommendation service 102 for generating a color-related recommendation at least partly in response to a user selection of an image, such as an image of an item. The color recommendation service 102 begins the routine at block 400. At block 402, a user selection of an image (or of an item having an associated image display with text describing the item) is received by color recommendation service 102 from a user via a user device. The selected image may have been selected from recommendations previously presented to the user, such as in response to an earlier color-related query. In association with the image selection, the user may have earlier (or after making the image selection) provided other terms or filters (e.g., entered as text, selected from a menu, or otherwise provided), such as a price range, desired brands, etc.

At block 404, the color recommendation service 102 determines color information of an item in the selected image or from the selected image. The color information, such as a color palette, may be accessed from metadata associated with the image, which may identify a dominate color and/or other colors of the item or image, or the image may be processed to determine a dominant color of the item in the image and optionally, other item or image colors. Optionally, the color palette of the item in the image may be determined in substantially real time (e.g., less than 1 second, less than 10 seconds, etc.) using a palette generation routine, such as that discussed herein with respect to FIG. 7 and elsewhere. At block 406, the color recommendation service 102 determines an item type and/or item category from metadata associated with the image or by performing object recognition to identify the item in the image.

At block 408, the color recommendation service 102 may access the item data store 130, which may correspond to an electronic catalog of items to identify items corresponding to the item type or category and other user specified terms or filters (e.g., price, brand, etc.). For example, item records in the item data store 130 may have tags or other metadata/keywords that identify and/or describe the respective items as similarly discussed above. By way of example, the item data store 130 may store item records for respective items in one or more electronic catalogs including item identifiers, such as described above. By way of further example, the item metadata may indicate the item type and/or category, such as "dress" and "clothing," or "blender" and "kitchen appliance." In addition, the item metadata may include color name text or other metadata identifying one or more colors of the item or of versions of the item, such as the color names "red," "orange," "blue," etc. Still further, a given item record may include one or more images of the item. Item record data may have been provided by an operator of a commerce site, by consumers, third party databases, and/or other sources.

The color recommendation service 102 may compare selected metadata of the selected image with item metadata or other data in the item data store 130 to identify items that are sufficiently similar to the item in the selected image to be considered as corresponding or matching. For example, one or more rules may be defined by the user and/or a system operator that specify how close an item needs to be in order to be considered a match for an item in the image. By way of illustration, a rule may specify that if an item in an image is a long-sleeved dress shirt, then only other long-sleeved dress shirts will be considered a match. By contrast, a rule may specify that if an item in an image is a long-sleeved dress shirt, then both long sleeved and short sleeved dress shirts will be considered a match. The color recommendation service 102 may store a temporary record of the matching items (e.g., by storing a list of corresponding item identifiers). The color recommendation service 102 may rank the matching items in accordance with the closeness of the match to the item in the selected image to provide a relevancy ranking. Optionally, in addition, a user's preferences may be used in ranking matching items. By way of example, the user's preferences may be determined based on the user's purchase or browse history (which may indicate the colors of items purchased or browsed by the user), items already in the user's wardrobe (e.g., as may be determined from the user wardrobe database 132), prior user color-related search queries, or preferences explicitly provided by the user via a preference form or otherwise. In addition or alternatively, preferences of other users or groups of users (whether selected by the user or dynamically determined by the color recommendation service 102) may be used in ranking matching items. For example, if a user "follows" or is otherwise associated with a particular fashion expert (e.g., via a social networking site), the expert's preferences may be identified and then used to rank matching items.

At block 410, the color recommendation service 102 optionally identifies one or more color palettes that correspond to the identified color palette of the item depicted in the selected image. For example, the color recommendation service 102 may compare the identified color palette of one or more colors from the selected image with metadata (e.g., color names) associated with palettes to identify items having matching or relevant palettes. The identified palettes may be ranked in accordance with a determination as to how closely a given palette corresponds to the palette of the selected image. For example, palettes may have an assigned weight indicating which is the most dominant color (where a color may or may not be a shade of a color), the second most dominant color, and so on. Optionally, only palettes within a certain range of the palette of the selected image or only a specified maximum number of palettes will be identified (e.g., the 10 closest palettes). As similarly discussed above, palette weighting may also be based at least in part on one or more of the palette date, and optionally on one or more of the user's gender, geographic region, ethnic group, age, palette popularity trends, etc.

At block 412, the color recommendation service 102 filters the matching items in order to filter out items whose color palette(s) do not sufficiently match the color palette of the item in the selected image. For example, the color recommendation service 102 may determine from metadata associated with the matched items whether they match the palettes identified at block 410. Optionally, the color recommendation service 102 may determine from metadata associated with the matched items whether they match the colors from the color palette of the item as determined at block 404. As yet another option, the color recommendation service 102 may rank the filtered list according to the previously performed ranking of matching items. As a further option, the color recommendation service 102 may rank the filtered list according to the ranking of closeness of the item color palette to the item in the selected image. As yet a further option, some combination of the ranking of matching items performed at block 408 and a ranking based on the closeness of the item color palette to the color palette of the item in the selected image may be used to generate a further relevancy ranking of items.

At block 414, the filtered list or the ranked filtered list is provided for display on the user device (e.g., via a browser installed on the user device, via a dedicated application such as a mobile device app, or otherwise) as recommended items based at least in part on the user's image selection. The provided list may be in the form of only images of the matching items, where the images may be retrieved from the item data store 130. The provided list may be in the form of only text identifying and/or describing the matching items, where the text may be retrieved from the item data store 130. The provided list may be in the form of both images of the matching items and corresponding text retrieved from the item data store 130. Optionally, controls may be provided to the user via which the user can indicate that a larger or a smaller number of matching items are to be presented. In response, the color recommendation service 102 may accordingly modify the number of items presented to the user. For example, if the user indicates that fewer items are to be presented to the user, the color recommendation service 102 may present the higher ranked items and not present a number of lower ranked items that had previously been presented.

At block 416, a determination is made as to whether the user has selected an item in the list of items. If the user has selected an item, at block 418, an item detail page is provided for display on the user device. The item detail page may include detailed information regarding the item, such as one or more images, descriptive text, color name, a price, weight, size options, reviews of the item by other users or by professional reviewers, alternative similar items, and/or other information. The item detail page may also include controls via which the user can select among various versions of the item (e.g., size, color, etc.), and a purchase control via which the user can initiate purchase of the item. A control may also be provided via which the user can cause the list of matching items to be again presented to the user.

Optionally, at block 420, the color recommendation service 102 may utilize metadata associated with the item selected by the user to identify similar and/or coordinating items to the user. For example, the color recommendation service 102 may utilize color information associated with the selected item (e.g., associated with the image of the selected item), the item type information, and/or the item categorization information to identify related and/or coordinating items. For example, if the user selected a dress having a palette with a deep shade of red as the primary color, the color recommendation service 102 may identify and present items having a similar palette with deep red as a primary color. By way of further example, the color recommendation service 102 may identify item accessories (e.g., a scarf, earrings, handbag, etc.) whose color(s) coordinate with the selected dress, such as may be determined by accessing the palette data store 110, to determine an ordered list of affiliated colors. The color recommendation service 102 may further select a coordinating item or filter affiliated color item candidates by applying heuristics based on item taxonomy. Optionally, the color recommendation service 102 may identify item accessories or coordinating items in response to a user selection (e.g., where the user provides or selects an additional item type or item category query). In addition or alternatively, preferences of other users or groups of users (whether selected by the user or dynamically determined by the color recommendation service 102) may be used to select coordinating items. For example, if a user "follows" or is otherwise associated with a particular fashion expert (e.g., via a social networking site), the expert's preferences may be identified and then used to select or filter items identified as having one or more affiliated colors. At block 422, the color recommendation service 102 ends the routine.

Figure 5:
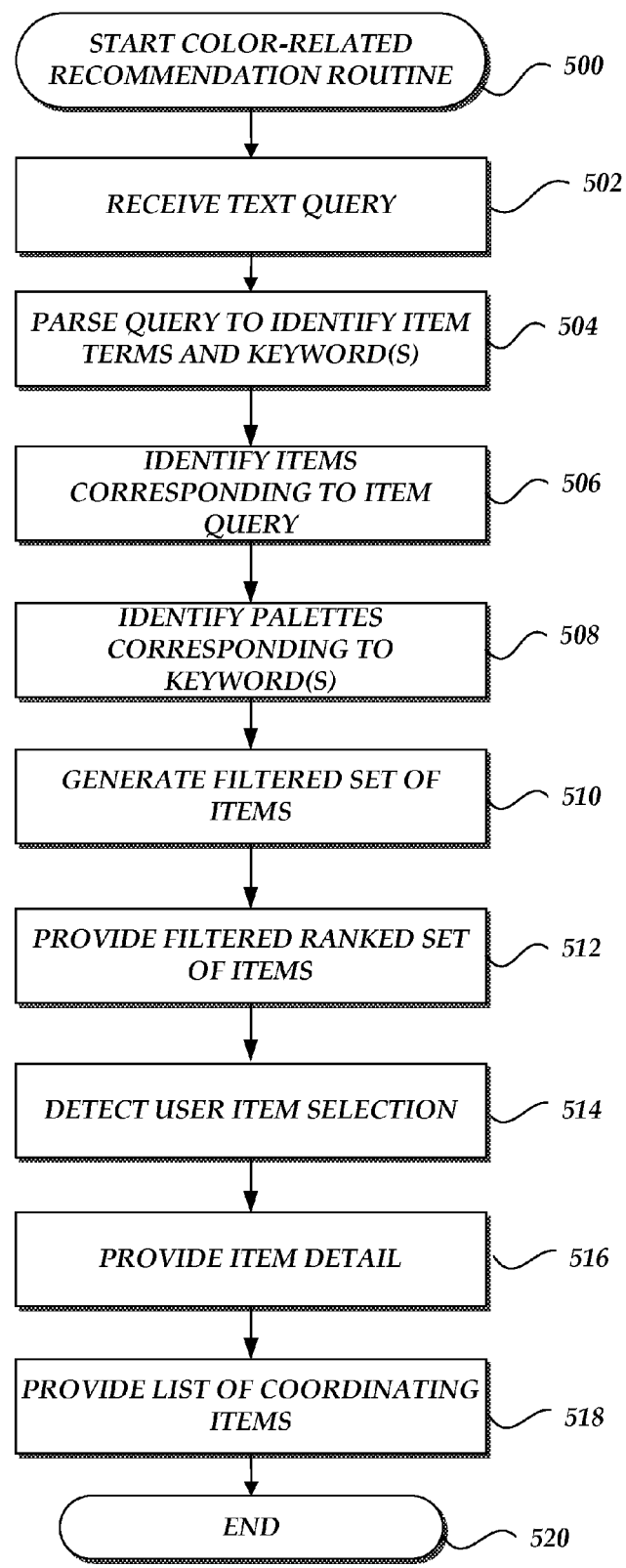
FIG. 5 is a flow diagram illustrating an embodiment of a routine implemented by the color recommendation service to provide recommendations in response to a keyword query.

Example Recommendation Process to Generate Color-Related Recommendations in Response to a Text Query Including a Keyword FIG. 5 illustrates a flow diagram of an example routine performed by color recommendation service 102 for generating a color-related recommendation at least partly in response to a query including a keyword, the routine implemented by the color recommendation service 102. The color recommendation service 102 begins the routine at block 500. At block 502, a text query is received by color recommendation service 102 from a user via a user device. The text query may optionally specify an item type or category (e.g., a dress, a top, pants, etc.), and a non-color keyword that may be suggestive of one or more colors (e.g., summery, sunny, mellow, dressy, holiday, Halloween, Christmas, Chanukah, sports team name (e.g., Dodgers, Seahawks, etc.)). The query may also include other terms or filters (e.g., entered as text, selected from a menu, or otherwise provided), such as a price range, desired brands, etc. Optionally, rather than or in addition to the user expressly entering a keyword, a keyword may be a keyword identified in response to a user search (e.g., the keyword can be an item identifier of an item identified in a search). The user may also specify other terms or filters (e.g., entered as text, selected from a menu, or otherwise provided), such as a price range, desired brands, item identifier, etc.

At block 504, the color recommendation service 102 may parse the user text query to identify items that correspond to item type or category, and terms that correspond to the keyword(s). For example, if the query is "summery dress," the color recommendation service 102 may use a dictionary of keywords, such as dictionary data store 112, and colors to determine that the term "summery" is a keyword and that the term "dress" is an item type. For example, the dictionary may include records of keywords. A given keyword record may indicate if the keyword corresponds to an item type (and if so, specifies the item type(s)), an item category (and if so, specifies the item category or categories), or is color-related (and if so, specifies one or more related color palettes). Optionally, one or more keywords may be automatically generated and utilized in providing recommendations (e.g., based on the current date, season, weather forecast for the day, geographic location of the user, what events are scheduled on the user's calendar, what media the user is currently viewing/listening to, to where the user is traveling, etc.). For example, if the query includes "formal" and the query is received in the winter, a keyword of "winter" may be automatically added to the user query (which may cause black formalwear to be recommended to the user). If, on the other hand, the query includes "formal" and the query is received in the summer, a keyword of "summer" may be added to the user query (which may cause white formalwear to be recommended to the user).

At block 506, the color recommendation service 102 may access the item data store 130, which may correspond to an electronic catalog of items to identify items corresponding to the item type or category and optionally other terms (e.g. price, brand, etc.). For example, item records in the item data store 130 may have tags or other metadata/keywords that identify and/or describe the respective items. By way of example, the item data store 130 may store item records for respective items in one or more electronic catalogs including item identifiers. By way of further example, the item metadata may indicate the item type and/or category, such as "dress" and "clothing," or "blender" and "kitchen appliance."

In addition, the item metadata may include text identifying one or more colors (or color palettes including one or more colors) of the item or of versions of the item, such as "red," "orange," "blue," etc. Still further, a given item record may include one or more images of the item. Item record data, including images, may have been provided by an operator of a commerce site, by consumers, third party databases, social network sites, and/or other sources. The color recommendation service 102 may compare the user text query with item metadata or other data to identify items that correspond to the query. The color recommendation service 102 may store a temporary record of the matching items (e.g., by storing a list of corresponding item identifiers). The color recommendation service 102 may rank the matching items in accordance with the closeness of the match to the query. Optionally, a user's preferences, such as may be indicated by the user's purchase or browse history, items already in the user's wardrobe (e.g., as may be determined from the user wardrobe database 132), prior user color-related search queries, or preferences explicitly provided by the user via a preference form or otherwise, may be used in ranking matching items. In addition or alternatively, preferences of other users or groups of users (whether selected by the user or dynamically determined by the color recommendation service 102) may be used in ranking matching items. For example, if a user "follows" or is otherwise associated with a particular fashion expert (e.g., via a social networking site), the expert's preferences may be identified and then used to rank matching items.

At block 508, the color recommendation service 102 identifies one or more color palettes that correspond to the identified keyword included in the query. For example, the color recommendation service 102 may compare the identified one or more keywords in the query with metadata associated with palettes to identify matching or relevant palettes stored in the palette data store 110, where a given palette may have one or more associated keywords stored as metadata. The identified palettes may be ranked in accordance with a determination as to how closely a given palette corresponds to the keyword in the query. For example, palettes may have an assigned weight indicating which is the most dominant color (where a color may or may not be a shade of a color), the second most dominant color, and so on. Optionally, only palettes within a certain range of the color in the query or only a specified maximum number of palettes will be identified (e.g., the 10 closest palettes). Other factors may be taken into account in weighting palettes. For example, attitudes and perceptions of colors, and what colors coordinate with what other colors, may change over time, based on gender, geographic region, ethnic group, age, palette popularity trends, etc. Thus, the palette weighting may be based at least in part on one or more of the palette date, user's gender, geographic region, ethnic group, age, palette popularity trends, etc.

By way of example, the keyword "Halloween" may be associated with orange and green palettes, which are typically associated with the Halloween holiday. By way of further example, a given sports team may be associated with palettes in the team's color(s). By way of yet further example, the keyword "formal" may be associated with palettes considered more formal, such as blacks, greys, dark blues, etc. For more example details on the automatic identification of color palettes and the generation of collections of items based on keywords and on color searching based on a keyword, see U.S. patent application Ser. No. 14/316,153, entitled "IDENTIFYING DATA FROM KEYWORD SEARCHES OF COLOR PALETTES," filed on Jun. 26, 2014, U.S. patent application Ser. No. 14/315,914, entitled "GENERATING VISUALIZATIONS FROM KEYWORD SEARCHES OF COLOR PALETTES," filed on Jun. 26, 2014, U.S. patent application Ser. No. 14/315,913, entitled "DETERMINING AFFILIATED COLORS FROM KEYWORD SEARCHES OF COLOR PALETTES," filed on Jun. 26, 2014, U.S. patent application Ser. No. 14/315,995, entitled "IDENTIFYING DATA FROM KEYWORD SEARCHES OF COLOR PALETTES AND KEYWORD TRENDS," filed on Jun. 26, 2014, U.S. patent application Ser. No. 14/315,947, entitled "IDENTIFYING DATA FROM KEYWORD SEARCHES OF COLOR PALETTES AND COLOR PALETTE TRENDS," filed on Jun. 26, 2014, U.S. patent application Ser. No. 14/315,938, entitled "DETERMINING COLOR NAMES FROM KEYWORD SEARCHES OF COLOR PALETTES," filed on Jun. 26, 2014, and U.S. patent application Ser. No. 14/316,467, entitled "AUTOMATIC COLOR PALETTE BASED SUGGESTIONS FOR MERCHANDISERS," filed on Jun. 26, 2014, each of which is incorporated by reference herein in its entirety.

At block 510, the color recommendation service 102 filters the matching items from block 506 in order to filter out items whose color(s) do not sufficiently match the keyword in the query. For example, the color recommendation service 102 may determine from metadata associated with the matched items from block 506 whether they sufficiently match or correspond to the palettes identified at block 508. Optionally, the color recommendation service 102 may rank the filtered list according to the ranking of matching items performed at block 506. The color recommendation service 102 may also optionally rank the filtered list according to the ranking of closeness of the item color to the color query. As yet another option, some combination of the ranking of matching items performed at block 506 and a ranking based on the closeness of the item color palette to the keyword suggestive of a color may be used to generate a further relevancy ranking of items. The list of matching items from block 506 may also be filtered based on price, brand, item identifier, etc.

At block 512, the filtered list or the ranked filtered list is provided for display on the user device (e.g., via a browser installed on the user device, via a dedicated application such as a mobile device app, or otherwise) as recommended items based at least in part on the user's query. The provided list may be in the form of only images of the matching items, where the images may be retrieved from the item data store 130. The provided list may be in the form of only text identifying and/or describing the matching items, where the text may be retrieved from the item data store 130. The provided list may be in the form of both images of the matching items and corresponding text retrieved from the item data store 130. Optionally, controls may be provided to the user via which the user can indicate that a larger or a smaller number of matching items are to be presented. In response, the color recommendation service 102 may accordingly modify the number of items presented to the user. For example, if the user indicates that fewer items are to be presented to the user, the color recommendation service 102 may present the higher ranked items and not present a number of lower ranked items that had previously been presented.

At block 514, a determination is made as to whether the user has selected an item in the list of items. If the user has selected an item, at block 516, an item detail page is provided for display on the user device. The item detail page may include detailed information regarding the item, such as one or more images, descriptive text, a price, weight, size options, reviews of the item by other users or by professional reviewers, alternative similar items, and/or other information. The item detail page may also include controls via which the user can select among various versions of the item (e.g., size, color, etc.), and a purchase control via which the user can initiate purchase of the item. A control may also be provided via which the user can cause the list of matching items to be again presented to the user.

Optionally, the color recommendation service 102 may utilize metadata associated with the item selected by the user to identify similar and/or coordinating items to the user. For example, the color recommendation service 102 may utilize color information associated with the selected item (e.g., associated with the image of the selected item), the item type information, and/or the item categorization information to identify related and/or coordinating items. For example, if the user selected a dress having a palette with a deep shade of red as the primary color, the color recommendation service 102 may identify and present items having a similar palette (e.g., an affiliated color) with deep red as a primary color. By way of further example, the color recommendation service 102 may identify item accessories (e.g., a scarf, earrings, handbag, etc.) whose color(s) coordinate with the selected dress. The color recommendation service 102 may further select a coordinating item or filter affiliated item candidates by applying heuristics based on item taxonomy. Optionally, the color recommendation service 102 may identify item accessories or coordinating items in response to a user query (e.g., where the user provides or selects an additional item type or item category query). At block 518, the list of coordinating items is provided for display on the user device. The identification of similar items and/or coordinating items based on a user selection of an item image (or of an item with an associated image) is discussed in greater detail with reference to FIG. 4. At block 520, the color recommendation service 102 ends the routine.

Figure 6:
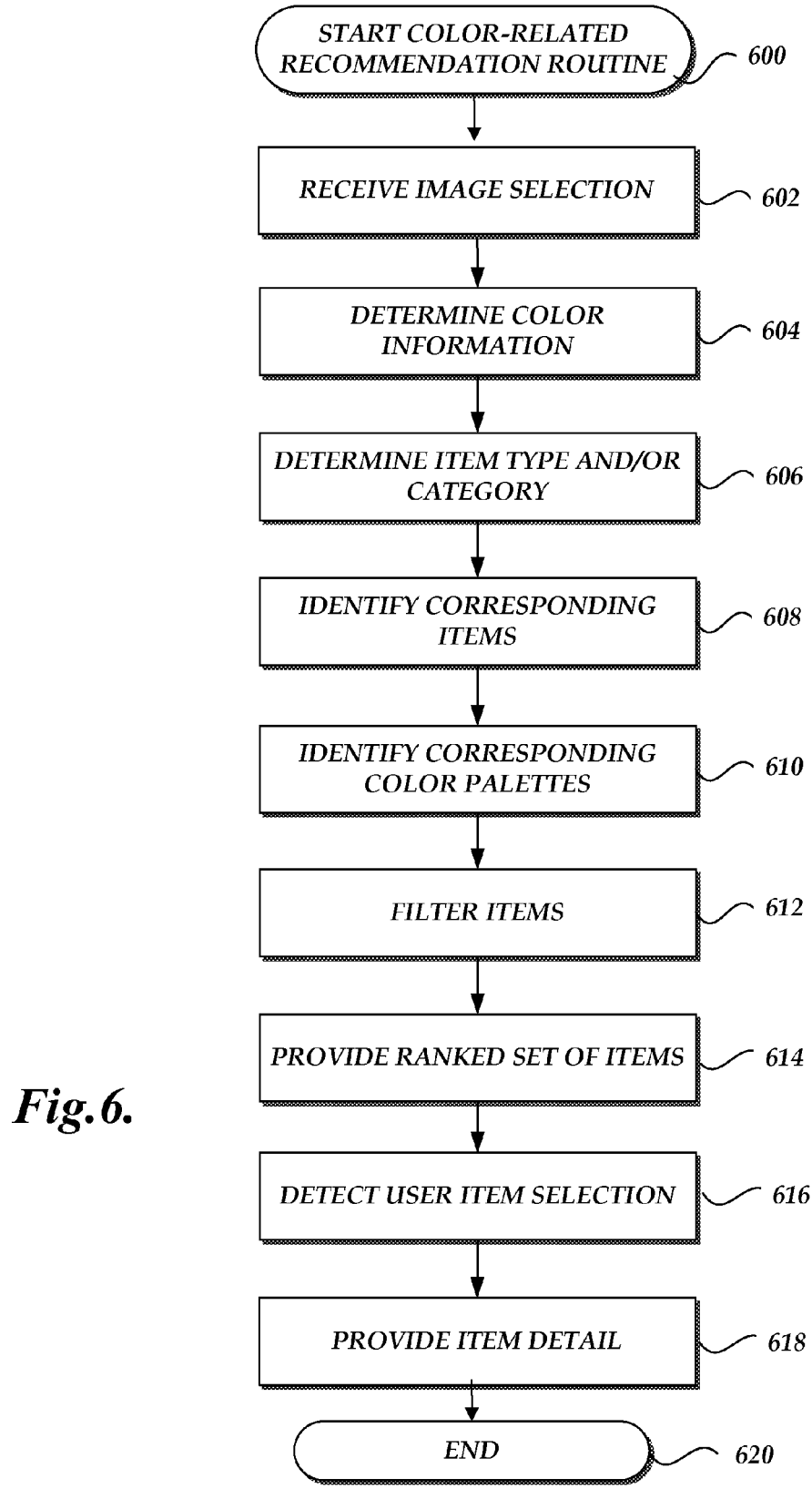
FIG. 6 is a flow diagram illustrating an embodiment of a routine implemented by the color recommendation service to provide wardrobe recommendations.

Example Recommendation Process to Generate Color-Related Wardrobe Recommendations in Response to an Image Selection FIG. 6 illustrates a flow diagram of an example routine 600 performed by color recommendation service 102 for generating a color-related wardrobe recommendation at least partly in response to a user selection of an image, such as an image of an item of clothing provided by the user. The color recommendation service 102 begins the routine at block 600. At block 602, a user selection of an image (or of an item having an associated image display with text describing the item) is received by color recommendation service 102 from a user via a user device and may be used as a query. The selected image may have been selected from a set of images of the user's wardrobe being presented to the user, where the images may have previously been provided by the user and stored in user wardrobe data store 132. For example, the user may have taken photographs or videos of clothing the user may have at home and uploaded such photographs or videos for storage in the user wardrobe data store 132. Alternatively or in addition, the user may provide a keyword, such as "fiery," which is received by the routine. At block 604, the routine determines color information, such as a color palette, from the selected image and/or identifies palettes corresponding to the keyword, as similarly discussed with respect to FIG. 5. The color information may be accessed from metadata associated with the image, which may identify a dominate color and/or other colors of the item, or the image may be processed to determine a dominant color of the item in the image and optionally, other image colors, to generate a color palette in substantially real time. At block 606, the color recommendation service 102 determines an item type and/or item category from metadata associated with the image.

At block 608, the color recommendation service 102 may access the user wardrobe data store 130 to identify accessory or coordinating items corresponding to the item type or category. For example, item records in the user wardrobe data store 130 may include metadata that identify and/or describe the respective items as similarly discussed above. By way of illustration, the user wardrobe data store 130 may store user wardrobe records for respective items in the user's wardrobe, optionally including item identifiers, such as described above. By way of further example, the item metadata may indicate the item type and/or category, such as "dress" and "clothing," or "blender" and "kitchen appliance." Still further, a given item record may include one or more images of the item provided by a user or selected by the user from a data store of images. The color recommendation service 102 may compare selected metadata of the selected image with item metadata or other data in the user wardrobe data store 130 to identify items that are similar to or coordinate with the item in the selected image. For example, the color recommendation service 102 may use a dictionary of coordinating items, such as dictionary data store 112, to identify coordinating items. By way of illustration, if the user has selected an image of a blouse, the color recommendation service 102 may access a dictionary of coordinating items indicating that a blouse may coordinate with the following items: skirt, belt, shoes, scarf, and purse.

The color recommendation service 102 may store a temporary record of the matching items (e.g., by storing a list of corresponding item identifiers) that are similar to or coordinate with the item in the selected image. The color recommendation service 102 may rank the matching items in accordance with the closeness of the match to the query (e.g., how well they coordinate with the wardrobe item in the selected image). Optionally, a user's preferences, such as may be indicated by the user's purchase or browse history or preferences explicitly provided by the user via a preference form or otherwise, may also be used in ranking matching items.

At block 610, the color recommendation service 102 identifies one or more color palettes that correspond to the color palette for the item in the selected image and/or that correspond to a keyword provided by the user. For example, the color recommendation service 102 may compare the color palette corresponding to the item in the selected image and/or colors in the query (or associated with the keyword) with metadata associated with palettes to identify matching or coordinating palettes (e.g., affiliated colors). The identified palettes may be ranked in accordance with a determination as to how well a given palette corresponds to the color palette for the item in the selected image. For example, palettes may have an assigned weight indicating which is the most dominant color (where a color may or may not be a shade of a color), the second most dominant color, and so on. Optionally, only palettes within a certain range or the color in the query or only a specified maximum number of palettes will be identified (e.g., the 10 closest palettes).

At block 612, the color recommendation service 102 filters the matching items from block 608 in order to filter out items whose color(s) do not sufficiently match the color in the query (e.g., are not sufficiently similar in color to the item or are not sufficiently affiliated with the item color). For example, the color recommendation service 102 may determine from metadata associated with the matched items from block 608 whether they match/coordinate with the palettes identified at block 610.

At block 614, the filtered list or the ranked filtered list is provided for display on the user device (e.g., via a browser installed on the user device, via a dedicated application such as a mobile device app, or otherwise) as recommended items based at least in part on the user's query. The provided list may be in the form of only images of the matching items, where the images may be retrieved from the user wardrobe data store 132. The provided list may be in the form of only text identifying and/or describing the matching items, where the text may be retrieved from the user wardrobe data store 132. The provided list may be in the form of both images of the matching items and corresponding text retrieved from the user wardrobe data store 132. Optionally, controls may be provided to the user via which the user can indicate that a larger or a smaller number of matching items are to be presented. In response, the color recommendation service 102 may accordingly modify the number of items presented to the user. For example, if the user indicates that fewer items are to be presented to the user, the color recommendation service 102 may present the higher ranked items and not present a number of lower ranked items that had previously been presented. Optionally, the color recommendation service 102 may identify and provide for display to the user matching/coordinating items that are not in the user's wardrobe but are available for purchase from one or more identified commerce sites.

At block 616, a determination is made as to whether the user has selected an item in the list of items. If the user has selected an item, at block 618, an item detail page is provided for display on the user device. The item detail page may include detailed information regarding the item, such as one or more images, descriptive text, size information, fabric/material, and/or other information. At block 620, the color recommendation service 102 ends the routine.

The foregoing process may be similarly utilized by a merchandiser or a maintainer of an item data store in assembling sets of items, such as clothing items, from one or more catalogs of items. For example the catalog of items may be stored in one or more catalog data stores, such as item data store 130. The merchandiser may request that a pink outfit be identified using specified different item types (e.g., blouses, skirts, shoes, handbags) or categories from the catalog data stores. The merchandiser may specify that items in affiliated colors may be included in the outfit. The color recommendation service 102 may then generate one or more recommended outfits as similarly discussed above with respect to generating outfits for a user. The merchandiser may select one or more of the presented outfits and cause a record to be stored, for later access, of the outfits including identifiers associated with each item included in a given outfit and a respective outfit. Multiple outfits having similar palettes or color schemes may be grouped as a collection. The merchandiser may then instruct that one or more of the outfits, as selected by the merchandiser, or the collection as a whole, be published on a commerce site or elsewhere to enable consumer access and purchase. The merchandiser may also instruct that one or more of the outfits, as selected by the merchandiser, or the collection as a whole, be published as on advertisement on one more sites or other advertising channels. Thus, item color information, such as color palettes and color names, may be used to organize and cluster content and items into sets, such as outfits, sets of coordinated furniture, etc.

Example Palette Generation Process

Aspects of generating a color palette based on a color image will now be described in greater detail. A color palette can be a collection of representative colors each associated with a weight or other metadata. A color palette may be generated based on palette generation criteria, which may facilitate or control a palette generation process. Illustratively, the palette generation process may include one or more of image pre-processing, color distribution generation, representative color identification, palette candidate generation, and palette determination. Representative colors with associated weight can be identified from a distribution of colors depicted by the color image, multiple palette candidates corresponding to the same color image can be generated based on various palette generation criteria, and a color palette can be identified therefrom.

In accordance with an illustrative embodiment, an image processing service obtains a color image depicting one or more goods, a design, a scene, or the like, and generates one or more palettes based on palette generation criteria. The palette generation criteria can be inputted by a consumer, a host of a commerce network site, a merchandise provider or vendor, or the like. Alternatively, or in addition, the palette generation criteria can be automatically generated by a computing device or system. The palette generation criteria may indicate various preferences, factors, parameters, thresholds, or requirements that facilitate or control a palette generation process. The palette generation may optionally be based on human color preferences.

Figure 7:
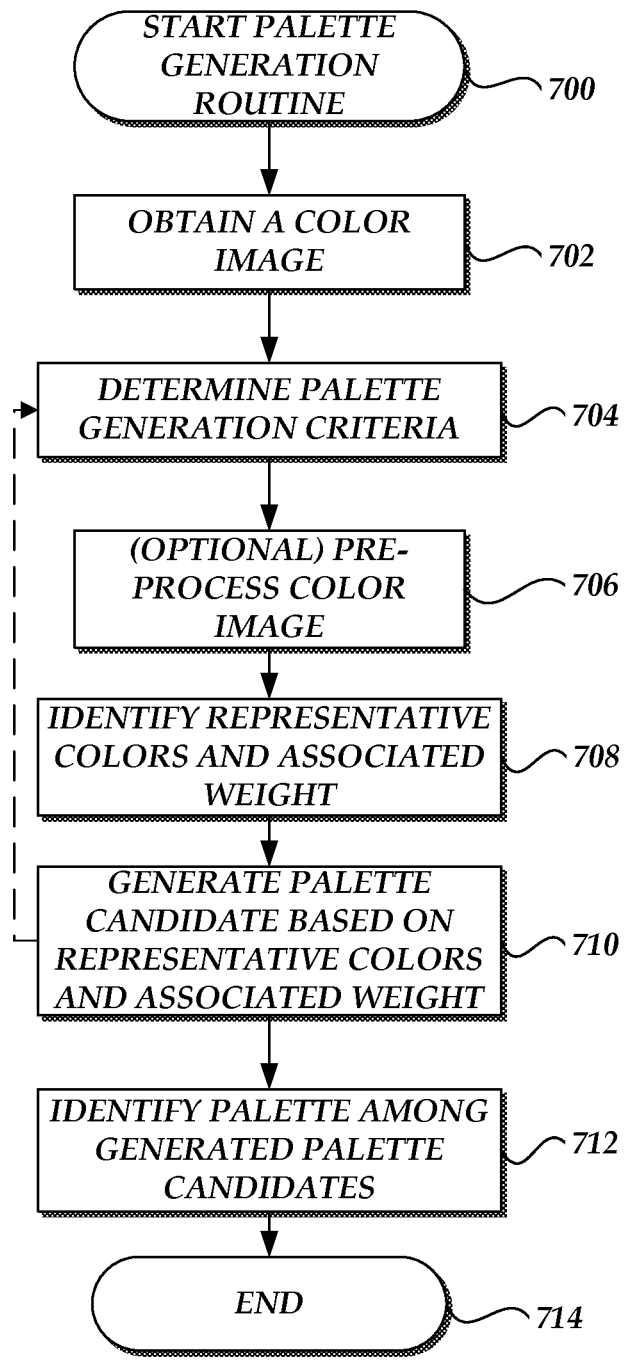
FIG. 7 is a flow diagram illustrating an embodiment of a palette generation routine implemented by the image processing service.

FIG. 7 is a flow diagram illustrating an embodiment of a palette generation routine implemented by the image processing service 104. The image processing service 104 begins the routine at block 700. At block 702, the image processing service 104 obtains a color image. The color image can depict one or more items, a design, a scene, a landscape, or any other content of color. Obtaining the color image can be accomplished by receiving image data from the item data store 130, third party users 140, or other image sources, via their image data transmission to the image processing service 104. Optionally, certain images transmitted may be images designated for calibrating the image processing service 104. For example, images comprising specific scope or variance of colors may be used as the basis for a color space. In another embodiment, images transmitted may need to be manually, semi-manually, semi-automatically, or automatically assessed and filtered so as to only retain those relevant to a purpose of the palette to be generated.

Metadata associated with the color image can also be obtained. The metadata may include information corresponding to the colors (e.g., color names), color scheme, lighting source, lighting direction, or other factors regarding the color rendering of the image. The metadata may also include information about the currently obtained color image, other color images, subjects or category of subjects depicted, sources contributing to the image, or their interrelations. The metadata can further include any other information associated with the color image as can be envisioned by a person of skill in the art.

At block 704, palette generation criteria are determined. As described earlier, the palette generation criteria can be input by an image source provider or a third party user 140, who may correspond to a host of a commerce network site, a merchandise provider or vendor, a visitor to the commerce network site, a designer, an artist, an architect, or the like. Alternatively, or in addition, the palette generation criteria can be automatically generated by the image processing service 104, or another computing device or system. For example, features or patterns exhibited by the color image as well as associated metadata can be considered by an automated process to determine the palette generation criteria.

The palette generation criteria may indicate various preferences, factors, parameters, thresholds, or requirements that facilitate or control the palette generation routine performed by image processing service 104. For example, the palette generation criteria may indicate a computational method for pre-processing the obtained color image, for generating a color distribution, for identifying representative colors, for generating palette candidates, or for determining a palette. The palette generation criteria may also indicate parameters, thresholds, restraints, formula(e), or other factors that may inform various computational methods applicable to the routine or subroutines that it may invoke. For example, the palette generation criteria can identify a color distance formula or can include one or more thresholds of color distance for merging similar colors when representative colors are identified from a color image. For more information on how to determine a human perceptible color difference and the human color distance formula, see U.S. patent application Ser. No. 14/316,483, entitled "IMAGE-BASED COLOR PALETTE GENERATION," filed on Jun. 26, 2014, and U.S. patent application Ser. No. 14/316,530, entitled "IMAGE-BASED COLOR PALETTE GENERATION," filed on Jun. 26, 2014, U.S. patent application Ser. No. 14/316,528, entitled "IMAGE-BASED COLOR PALETTE GENERATION," filed on Jun. 26, 2014, and U.S. patent application Ser. No. 14/316,549, entitled "IMAGE-BASED COLOR PALETTE GENERATION," filed on Jun. 26, 2014, each of which is incorporated by reference herein in its entirety.

In some embodiments, the obtained color image is pre-processed at block 706. For example, the color image may be converted to a format compatible with the palette generation routine 700 or its subroutines. The color image may also be classified or prioritized based on applicable metadata. Further, pre-processing can include noise removal, rotation, re-orientation, normalization in shape, size, resolution, or color, or other manipulations to facilitate relevant processes and methods.

Still further, pre-processing may include area marking or labeling within the color image. For example, various contour matching algorithms can be employed to mark out an area of interest. Alternatively, or in addition, areas of interest can be manually marked out. In some embodiments, a background can be removed during pre-processing through area marking or labeling. In another embodiment, one or more areas of interest can be cropped or extracted so that only these areas form the basis for palette generation. In still another embodiment, area marking or labeling may indicate colors that should be treated in a specific way, such as to be ignored, to be associated with more or less weight, to disambiguate to a greater or lesser extent. Information corresponding to pre-processing can be included in corresponding metadata that is associated with the color image, which can facilitate palette generation.

At block 708, representative colors and their associated weight are identified from the obtained color image. The identification of representative colors may include multiple subroutines or sub-elements. Various image processing or clustering algorithms can be employed to achieve this. In some embodiments, a color distribution, such as a histogram illustrating distinct colors with their corresponding weight, is generated based on the color image. The generation of color distribution can be facilitated or controlled by information included in the palette generation criteria. For example, the palette generation criteria can indicate a set of standardized colors and/or binning criteria as bases for generating the color distribution. Once the color distribution is generated, representative colors can be identified based on the color distribution, for example. The identification of representative colors can be facilitated or controlled by information included in the palette generation criteria or the metadata associated with the color image.

At block 710, a palette candidate is generated to include at least a subset of the identified representative colors and their associated weights. The palette candidate may further include metadata associated with the identified representative colors and weights.

In some embodiments, the palette generation criteria may specify or indicate criteria for determining which identified representative colors can be included in a palette candidate. For example, identified representative colors can each be associated with a weight. The palette generation criteria may indicate a threshold on the weights associated with identified colors to filter out colors that are relatively insignificant in the color image. The threshold can be dynamically generated based on a weight distribution of the identified representative colors. For example, the palette candidate can exclude identified representative colors associated with a weight lower than two standard deviations from a mean weight. Optionally, image processing service 104 can move back to block 704, where new palette generation criteria can be determined. Based on the new palette generation criteria, a new palette candidate can be generated.

At block 712, one or more palettes can be identified among previously generated palette candidate(s). In some embodiments, each generated palette candidate is automatically considered a final palette so additional identification is not required at block 712. In other embodiments, one or more palettes are identified among multiple palette candidates based on palette generation criteria that may indicate whether the identification should be performed manually or automatically, which attributes should be examined, or what standards should be applied to the identification, or the like.

Identification of palettes can be accomplished manually or semi-manually. For example, by repeating the routine from block 704 to block 710, a third party user 140 (e.g., a consumer) may experiment with various palette generation criteria settings that can lead to generation of multiple palette candidates. In other words, each generated palette candidate can correspond to a distinct setting of palette generation criteria. The third party user 140 may then select one or more of the candidates and label them as palettes associated with the color image. Alternatively, or in addition, the identification of palettes can be accomplished automatically or semi-automatically by the image processing service 104, or by another computing device or system. For example, information associated with change of color values and associated weight across various palette candidates can be considered a function of certain settings included in palette generation criteria corresponding to the various palette candidates. Accordingly, various optimization algorithms, such as gradient methods, dynamic programming, evolutionary algorithms, combinatorial optimization, or stochastic optimization, can be utilized to pick a palette candidate(s) that achieves an optimization based on the function. Illustratively, a palette candidate can be selected if a corresponding rate of color value change is close to zero, as measured in accordance with the function.

Once identified, the one or more palettes can be stored at the palette data store 110, either by creating new data entries or updating existing palettes. The image processing service 104 then ends the routine at block 714. Depending on relevant requirements or preferences indicated in the palette generation criteria corresponding to identified palettes, various metadata can be associated therewith, for purposes of indicating their color name, format, semantics, features, conditions, or the like. In some embodiments, metadata can link a palette to a corresponding color image from which the palette is derived. Alternatively, or in addition, metadata may indicate a category or a position in a taxonomy associated with the corresponding color image. Metadata can also indicate patterns, colocations, or other attributes of spatial distribution of palette colors within the corresponding color image.

For more example details on extracting colors from an image and building a color palette, see U.S. patent application Ser. No. 14/316,483, entitled "IMAGE-BASED COLOR PALETTE GENERATION," filed on Jun. 26, 2014, and U.S. patent application Ser. No. 14/316,292, entitled "BUILDING A PALETTE OF COLORS BASED ON HUMAN COLOR PREFERENCES," filed on Jun. 26, 2014, each of which is incorporated by reference herein in its entirety.

Example Image Metadata Validation Process

As discussed above, a merchandiser (or other vendor) may submit an image, such as a photograph, of an item for posting on an item detail page of a commerce site via which consumers may purchase the item. Typically, the image will be associated with metadata provided by the merchandiser, including one or more color names identifying the item (or items) in the image. However, not infrequently, the color name submitted by the merchandiser (or other source) is in error and does not match the color of the item in the image. For example, an image of a blue dress may be submitted with a color name of "purple." Having erroneous color names results in inaccurate image records and can result in incomplete or inaccurate recommendations and/or surfacing of search results. Thus, for example, if a search is performed for a blue dress (e.g., in response to a user query and/or as part of a recommendation process), the blue dress mistakenly tagged with the color name "purple" may not be identified in the search or to the user. Conversely, if a search is performed for a purple dress, the blue dress mistakenly tagged with the color name "purple" will be erroneously identified in the search and to the user as part of a recommendation.

Certain embodiments address the foregoing challenges by determining when certain image metadata, such as a color name, does not match the color palette of an item in the image. As will be discussed in greater detail below, the image processing service 104 accesses an image and associated metadata, including color names; processes the image to generate one or more color palettes; utilizes the color palettes to identify corresponding color names; and determines if the identified color names match the color names in the metadata. If the color names from the metadata do not match those determined from the generated color palettes, the image processing service 104 edits the metadata to include the color names determined from the generated color palettes and/or alerts an entity (such as an operator and/or the entity that provided the image) via a transmitted mismatch notification regarding the mismatch. In response to the mismatch notification, the entity that provided the image can manually compare the color names from the image metadata that do not match those color names determined from the generated color palettes, enabling the entity to determine which color name is correct. The entity can then select the appropriate color name to be stored as metadata with the image. Thus, searches and recommendations related to the item will be more accurate and complete.

Similarly, if an image is provided that does not include a color name, the image processing service 104 processes the image to generate one or more color palettes, utilizes the color palettes to identify corresponding color names, and edits the metadata to include the color names determined from the generated color palettes. This enables the item to be discovered in a search for the item type or category having the color as a search parameter. For example, the search may be performed in response to a user query (e.g., including a user provided or selected keyword and/or image) and/or as part of a recommendation process, as described elsewhere herein. Thus, searches and recommendations related to the item will be more accurate and complete.

Figure 8:
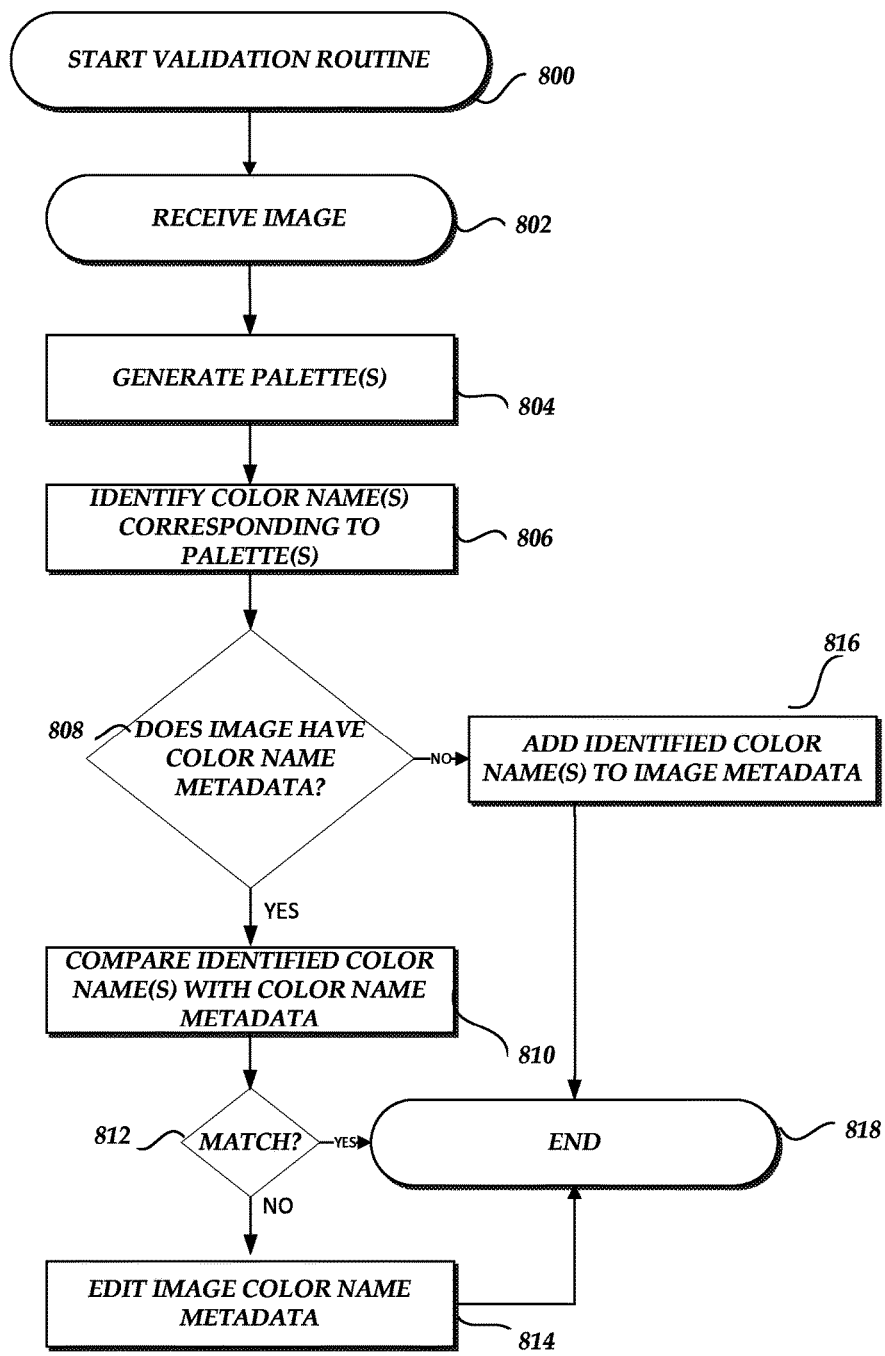
FIG. 8 is a flow diagram illustrating an embodiment of a color name validation routine implemented by the image processing service.

FIG. 8 is a flow diagram illustrating an embodiment of a color name validation routine implemented by an image processing service 104. The image processing service 104 begins the routine at block 800. At block 802, the image processing service 104 obtains a color image. The color image can depict one or more items (e.g., clothing, furniture, appliances, etc.), a design, a scene, a landscape, or any other content of color. Obtaining the color image can be accomplished by receiving image data from the item data store 130, the user wardrobe data store 132, third party users 140 (e.g., consumers or merchandisers seeking to sell items), or other image sources, via their image data transmission to the image processing service 104.

Metadata associated with the color image can also be obtained. The metadata may include information corresponding to the color palette (e.g., color names or other color identifiers, including names expressed using ASCII characters, icons, or other such data), color scheme, lighting source, lighting direction, or other factors regarding the color rendering of the image. The metadata may also include information about the currently obtained color image, other color images, subjects or category of subjects depicted, sources contributing to the image, or their interrelations. The metadata can further include any other information associated with the color image as can be envisioned by a person of skill in the art.

At block 804, one or more color palettes are generated for the image. For example, the techniques described above with respect to FIG. 7 or as disclosed in U.S. patent application Ser. No. 14/316,483, entitled "IMAGE-BASED COLOR PALETTE GENERATION," filed on Jun. 26, 2014, and U.S. patent application Ser. No. 14/316,292, entitled "BUILDING A PALETTE OF COLORS BASED ON HUMAN COLOR PREFERENCES," filed on Jun. 26, 2014, each of which is incorporated by reference herein in its entirety, may be used. The palette(s) may be generated so that the palette(s) reflect the primary color of the item being depicted for merchandising and sale, rather than the background scene or non-relevant items (e.g., by ignoring or placing less emphasis on color information towards the edges of the image).

At block 806, color names (which may be any type of color identifier, including names expressed using ASCII characters, icons, or other such data) corresponding to the generated palettes are identified. At block 808, a determination is made as to whether the metadata received in association with the image includes color identification information, such as a color name. If a determination is made that the metadata received in association with the image does not include color identification information, such as a color name, then at block 816 the identified color name may be stored as metadata in association with the image (e.g., in item data store 130, a dedicated image data store, or elsewhere).

If a determination is made that the metadata received in association with the image does include color identification information, such as a color name, then at block 810 a comparison is made between color identification information, such as a color name, for the generated palette and the color identification information, such as a color name, obtained via the image metadata. If, at block 812, a determination is made that the color identification information, such as a color name, for the generated palette and the color identification information, such as a color name, obtained via the image metadata sufficiently match, then at block 818 the image processing service 104 completes the routine. If, at block 812, a determination is made that the color identification information, such as a color name, for the generated palette and the color identification information, such as a color name, obtained via the image metadata do not sufficiently match, then at block 814 the identified color name (or other identifier) may be stored as metadata in association with the image (e.g., in item data store 130, a dedicated image data store, or elsewhere) and optionally the original color name (or other identifier) included in the metadata is deleted or an indication is stored that the original color name is mismatched and incorrect. At block 818, the color recommendation service 102 ends the routine.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain aspects described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method for generating a color palette, the computer-implemented method comprising:
    under control of a hardware computing device configured with specific computer-executable instructions,
        accessing a first color image and associated first color image metadata provided by a source for inclusion in an electronic catalog comprising item detail pages, wherein the first color image comprises an image of an item to be offered to users using the electronic catalog;
        processing the first color image by de-noising, normalization, or down sampling the first color image;
        identifying a plurality of representative colors and associated weights from a color distribution corresponding to the first color image;
        generating a first color palette for the first color image based at least in part on the identified plurality of representative colors and associated weights;
        determining a first color name associated with a dominant color of the generated first color palette for the first color image;
        at least partly in response to a determination that the first color image metadata includes a second color name, determining that the second color name included in the first color image metadata corresponds to the first color name associated with the generated first color palette for the first color image or that the second color name included in the first color image metadata is incorrect based at least in part on a determination that the second color name included in the first color image metadata does not correspond to the first color name associated with the dominant color of the generated first color palette for the first color image;
        adding the first color name associated with the dominant color of the generated first color palette to the first color image metadata and to an item detail page included in the electronic catalog at least partly in response to determining that:
        the second color name included in the first color image metadata is incorrect based at least in part on the determination that the second color name included in the first color image metadata does not correspond to the first color name associated the dominant color of with the generated first color palette;
        receiving from a user device a search query comprising color-related information and item information;
        identifying a plurality of items, including the item in the first color image, corresponding to the color-related information and the item information;
        generating a ranking for the identified plurality of items based at least in part on a closeness of corresponding item colors, including the dominant color associated with the first color name, to the color-related information; and
        generating and providing for display on the user device in accordance with the generated ranking, a ranked presentation of at least a portion of the identified plurality of items.

2. The computer-implemented method of claim 1 further comprising utilizing the added first color name associated with the dominant color of the first color palette to determine that an item depicted in the first image is to be recommended to a user in response to a color-related recommendation query request.

3. The computer-implemented method of claim 1 further comprising utilizing the added first color name associated with the dominant color of the first color palette to determine that the first image corresponds to a first keyword included in a color-related query.

4. The computer-implemented method of claim 1 further comprising transmitting a notification to an entity that provided the first image at least partly in response to determining that the second color name included in the first color image metadata does not correspond to the first color name associated with the dominant color of the first color palette.

5. The computer-implemented method of claim 1 further comprising deleting the second color name included in the first color image metadata from the first color image if the second color name included in the first color image metadata does not correspond to the first color name associated with the dominant color of the generated first color palette.

6. The computer-implemented method of claim 1 further comprising storing a mismatch indication regarding the second color name included in the first color image metadata if the second color name included in the first color image metadata does not correspond to the first color name associated with the dominant color of the generated first color palette.

7. A system comprising:
a data store configured to store computer-executable instructions; and
a hardware processor in communication with the data store, the hardware processor, configured to execute the computer-executable instructions to at least:
process a first color image by de-noising, normalization, or down sampling the first color image;
generate a first color palette corresponding to the first color image, the first color image associated with first color image metadata;
determine a first color name associated with a dominant color of the generated first color palette corresponding to the first color image;
determine that the first color image metadata includes a second color name or that the first color image metadata does not include a second color name;
at least partly in response to a determination that the first color image metadata includes a second color name, determine that the second color name included in the first color image metadata corresponds to the first color name associated with the generated first color palette corresponding to the first color image or that the second color name included in the first color image metadata is incorrect based at least in part on a determination that the second color name included in the first color image metadata does not correspond to the first color name associated with the dominant color of the generated first color palette corresponding to the first color image; and
add the first color name associated with the dominant color of the generated first color palette corresponding to the first color image to the first color image metadata at least partly in response to determining that:
the second color name included in the first color image metadata does not correspond to the color name associated with the dominant color of the generated first color palette corresponding to the first color image;
receive from a user device a search query comprising color-related information and item information;
identify a plurality of items corresponding to the color-related information and the item information;
generate a ranking for the identified plurality of items based at least in part on a closeness of corresponding item colors, including the dominant color associated with the first color name, to the color-related information; and
generate and provide for display on the user device in accordance with the generated ranking, a ranked presentation of at least a portion of the identified plurality of items.

8. The system of claim 7, wherein the hardware processor is further configured to execute the computer-executable instructions to at least utilize the added first color name associated with the dominant color of the first color palette to determine that an item depicted in the first image is to be recommended to a user in response to a color-related recommendation query request.

9. The system of claim 7, wherein the hardware processor is further configured to execute the computer-executable instructions to at least utilize the added first color name associated with the dominant color of the first color palette to determine that the first image corresponds to a first keyword included in a color-related query.

10. The system of claim 7, wherein the hardware processor is further configured to execute the computer-executable instructions to at least transmit a notification to an entity that provided the first image at least partly in response to determining that the second color name included in the first color image metadata does not correspond to the first color name associated with the dominant color of the first color palette.

11. The system of claim 7, wherein the hardware processor is further configured to execute the computer-executable instructions to at least delete the second color name included in the first color image metadata from the first color image if the second color name included in the first color image metadata does not correspond to the first color name associated with the dominant color of the generated first color palette.

12. The system of claim 7, wherein the hardware processor is further configured to execute the computer-executable instructions to at least store a mismatch indication regarding that the second color name included in the first color image metadata if the second color name included in the first color image metadata does not correspond to the first color name associated with the dominant color of the generated first color palette.

13. The system of claim 7, wherein the first image depicts at least one of a first item of clothing, a first item of furniture, or a first appliance.

14. A non-transitory computer-readable storage medium storing computer-executable instructions that when executed by a processor perform operations comprising:
processing a first color image by de-noising, normalization, or down sampling the first color image;
generating a first color palette corresponding to the first color image, the first color image associated with first color image metadata;
determining a first color name associated with a dominant color of the generated first color palette corresponding to the first color image;
at least partly in response to a determination that the first color image metadata includes a second color name, determining that the second color name included in the first color image metadata corresponds to the first color name associated with the generated first color palette corresponding to the first color image or that the second color name included in the first color image metadata is incorrect based at least in part on a determination that the second color name included in the first color image metadata does not correspond to the first color name associated with the dominant color of the generated first color palette corresponding to the first color image;

adding the first color name associated with the dominant color of the generated first color palette to the first color image metadata at least partly in response to determining that:

the second color name included in the first color image metadata does not correspond to the first color name associated with the dominant color of the generated first color palette corresponding to the first color image;

receiving from a user device a search query comprising color-related information and item information;

identifying a plurality of items, including the item in the first color image, corresponding to the color-related information and the item information;

generating a ranking for the identified plurality of items based at least in part on a closeness of corresponding item colors, including the dominant color associated with the first color name, to the color-related information; and generating and providing for display on the user device in accordance with the generated ranking, a ranked presentation of at least a portion of the identified plurality of items.

15. The non-transitory computer-readable storage medium of claim 14, the operations further comprising utilizing the added first color name associated with the dominant color of the first color palette to determine that an item depicted in the first image is to be recommended to a user in response to a color-related recommendation query request.

16. The non-transitory computer-readable storage medium of claim 14, the operations further comprising utilizing the added first color name associated with the dominant color of the first color palette to determine that the first image corresponds to a first keyword included in a color-related query.

17. The non-transitory computer-readable storage medium of claim 14, the operations further comprising transmitting a notification to an entity that provided the first image at least partly in response to determining that the second color name included in the first color image metadata does not correspond to the first color name associated with the dominant color of the first color palette.

18. The non-transitory computer-readable storage medium of claim 14, the operations further comprising deleting the second color name included in the first color image metadata from the first color image if the second color name included in the first color image metadata does not correspond to the first color name associated with the dominant color of the generated first color palette.

19. The non-transitory computer-readable storage medium of claim 14, the operations further comprising storing a mismatch indication regarding the second color name included in the first color image metadata if the second color name included in the first color image metadata does not correspond to the first color name associated with the dominant color of the generated first color palette.

20. The non-transitory computer-readable storage medium of claim 14, wherein the first image depicts at least one of a first item of clothing, first item of furniture, or a first appliance.

* * * * *